United States Patent
Teng et al.

(10) Patent No.: US 12,556,721 B2
(45) Date of Patent: Feb. 17, 2026

(54) DEVICE AND METHOD FOR DECODING VIDEO DATA

(71) Applicant: SHARP KABUSHIKI KAISHA, Sakai (JP)

(72) Inventors: Chih-Yu Teng, Taipei (TW); Yu-Chiao Yang, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 316 days.

(21) Appl. No.: 18/374,168

(22) Filed: Sep. 28, 2023

(65) Prior Publication Data

US 2024/0137533 A1    Apr. 25, 2024

Related U.S. Application Data

(60) Provisional application No. 63/415,431, filed on Oct. 12, 2022.

(51) Int. Cl.
| | |
|---|---|
| *H04N 19/186* | (2014.01) |
| *H04N 19/107* | (2014.01) |
| *H04N 19/117* | (2014.01) |
| *H04N 19/132* | (2014.01) |
| *H04N 19/139* | (2014.01) |
| *H04N 19/172* | (2014.01) |

(Continued)

(52) U.S. Cl.
CPC ......... *H04N 19/186* (2014.11); *H04N 19/107* (2014.11); *H04N 19/117* (2014.11); *H04N 19/132* (2014.11); *H04N 19/139* (2014.11); *H04N 19/172* (2014.11); *H04N 19/176* (2014.11); *H04N 19/513* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 2025/0080764 A1* | 3/2025 | Jhu | H04N 19/44 |
| 2025/0220156 A1* | 7/2025 | Lim | H04N 19/176 |
| 2025/0227239 A1* | 7/2025 | Astola | H04N 19/186 |

OTHER PUBLICATIONS

Youvalari R G et al: "Non-EE2: Gradient and location based convolutional cross-component model (GL-CCCM) for intra prediction", JVET-AB0119-v1, Joint Video Experts Team (JVET) of ITU-T SG 16 WP 3 and ISO/IEC JTC 1/SC 29, 28th Meeting, Mainz, DE, Oct. 20-28, 2022 (Oct. 14, 2022).

(Continued)

*Primary Examiner* — Jessica M Prince
(74) *Attorney, Agent, or Firm* — ScienBiziP, P.C.

(57) ABSTRACT

A method of decoding video data performed by an electronic device is provided. The method receives the video data and determines a block unit from a current frame included in the video data. The method further determines a plurality of luma reconstructed samples in a luma block of the block unit based on the video data and determines a prediction model filter of a prediction model mode for a chroma block of the block unit based on the video data. The method then determines a prediction model filter of a prediction model mode for a chroma block of the block unit based on the video data and reconstruct the chroma block of the block unit by applying the plurality of luma square values and the plurality of luma gradient values to the prediction model filter.

20 Claims, 7 Drawing Sheets

(51) Int. Cl.
　　　H04N 19/176　　(2014.01)
　　　H04N 19/513　　(2014.01)
　　　H04N 19/593　　(2014.01)

(56) References Cited

OTHER PUBLICATIONS

Li (Alibaba-Inc) X et al: "EE2-related: On Gradient Linear Model (GLM)", JVET-AA0138-v1, Joint Video Experts Team (JVET) of ITU-T SG 16 WP 3 and ISO/IEC JTC 1/SC 29, 27th Meeting, by teleconference, Jul. 13-22, 2022 (Jul. 7, 2022).
Astola (Nokia) P et al: "EE2-1.1 a: Convolutional cross-component intra prediction model", JVET-AA0057-v1, Joint Video Experts Team (JVET) of ITU-T SG 16 WP 3 and ISO/IEC JTC 1/SC 29, 27th Meeting, by teleconference, Jul. 13-22, 2022 (Jul. 6, 2022).
Series H: Audiovisual and Multimedia Systems Infrastructure of audiovisual services—Coding of moving video, Recommendation ITU-T H.266(Apr. 2022) Versatile video coding.
Muhammed Coban et al., "Algorithm description of Enhanced Compression Model 6 (ECM 6)", Joint Video Experts Team (JVET) of ITU-T SG 16 WP 3 and ISO/IEC JTC 1/SC 29, 27th Meeting, by teleconference, Jul. 13-22, 2022, [JVET-AA2025-v1].
Adrian Browne et al., "Algorithm description for Versatile Video Coding and Test Model 17 (VTM17)", Joint Video Experts Team (JVET) of ITU-T SG 16 WP 3 and ISO/IEC JTC 1/SC 29, 26th Meeting, by teleconference, Apr. 20-29, 2022, [JVET-Z2002-v2].
Pekka Astola et al., "AHG12: Convolutional cross-component model (CCCM) for intra prediction", Joint Video Experts Team (JVET) of ITU-T SG 16 WP 3 and ISO/IEC JTC 1/SC 29, 26th Meeting, by teleconference, Apr. 20-29, 2022, [JVET-Z0064-v1].
Che-Wei Kuo et al., "AHG12: Enhanced CCLM", Joint Video Experts Team (JVET) of ITU-T SG 16 WP 3 and ISO/IEC JTC 1/SC 29, 26th Meeting, by teleconference, Apr. 20-29, 2022, [JVET-Z0140-v2].
Benjamin Bross et al., "Versatile Video Coding (Draft 10)", Joint Video Experts Team (JVET) of ITU-T SG 16 WP 3 and ISO/IEC JTC 1/SC 29/WG 11, 19th Meeting: by teleconference, Jun. 22-Jul. 1, 2020, [JVET-S2001-vG].

\* cited by examiner

DEVICE AND METHOD FOR DECODING VIDEO DATA

CROSS-REFERENCE TO RELATED APPLICATION(S)

The present disclosure claims the benefit of and priority to U.S. Provisional Patent Application Ser. No. 63/415,431, filed on Oct. 12, 2022, entitled "Proposed Chroma Prediction Generation Method," the content of which is hereby incorporated herein fully by reference in its entirety.

FIELD

The present disclosure is generally related to video coding and, more specifically, to techniques for predicting a chroma block of a block unit based on a luma block of the block unit.

BACKGROUND

Linear model prediction is a coding tool for video coding, in which an encoder and a decoder may use the previously reconstructed pixels adjacent to a block unit and included in one predefined reference region to estimate a prediction model equation of a prediction model mode for predicting or reconstructing several chroma pixels of the block unit based on several reconstructed luma pixels of the block unit.

When the encoder and the decoder calculate the prediction model equation, they merely consider a linear model equation and try to calculate several prediction model parameters of the linear model equation. However, the linear model equation may be inadequate to predict all of the block units in the video. In addition, the decoding efficiency may be low when the prediction model equation of the prediction model mode can only be the linear model equation.

Therefore, different kinds of prediction model equations may be required for the encoder and the decoder to be able to precisely and efficiently predict and/or reconstruct the chroma pixels.

SUMMARY

The present disclosure is directed to a device and method for predicting a chroma block of a block unit based on a luma block of the block unit.

In a first aspect of the present disclosure, a method of decoding video data and an electronic device for performing the method are provided. The method includes determining a block unit from a current frame included in the video data; determining multiple luma reconstructed samples in a luma block of the block unit based on the video data; determining a prediction model filter of a prediction model mode for a chroma block of the block unit based on the video data; determining multiple luma square values and multiple luma gradient values based on the multiple luma reconstructed samples; and reconstructing the chroma block of the block unit by applying the multiple luma square values and the multiple luma gradient values to the prediction model filter.

In an implementation of the first aspect, the multiple luma reconstructed samples are applied to a down-sampling filter to generate multiple luma down-sampled values, each of the multiple luma down-sampled values is applied to a gradient filter to generate the multiple luma gradient values, and each of the multiple luma down-sampled values is squared to generate the multiple luma square values.

In an implementation of the first aspect, the gradient filter includes one of a vertical gradient filter and a horizontal gradient filter.

An implementation of the first aspect further includes determining a reference region neighboring the block unit; determining multiple luma neighboring samples and multiple chroma neighboring samples of the reference region; determining a first filter parameter and a second filter parameter of the prediction model filter based on the multiple luma neighboring samples and the multiple chroma neighboring samples; and applying the multiple luma square values and the multiple luma gradient values to the prediction model filter by multiplying the multiple luma square values by the first filter parameter and multiplying the multiple luma gradient values by the second filter parameter.

In an implementation of the first aspect, the prediction model mode includes multiple non-linear model filters, the prediction model filter includes one of the multiple non-linear model filters, and each of the multiple non-linear model filters includes a first filter parameter and a second filter parameter.

An implementation of the first aspect further includes determining a reference region neighboring the block unit; determining multiple luma neighboring samples and multiple chroma neighboring samples of the reference region; determining multiple neighboring down-sampled values based on the multiple luma neighboring samples; categorizing the multiple neighboring down-sampled values into multiple model groups based on one or more luma threshold values; categorizing the multiple chroma neighboring samples into the multiple model groups based on a distribution of the multiple neighboring down-sampled values in the multiple model groups; and determining the first filter parameter and the second filter parameter for each of the multiple non-linear model filters based on the multiple neighboring down-sampled values and the multiple chroma neighboring samples in a corresponding one of the multiple model groups.

In an implementation of the first aspect, a number of the multiple model groups is equal to a number of the multiple non-linear model filters, and a number of the one or more threshold values is equal to a value generated by subtracting one from the number of the multiple model groups.

In an implementation of the first aspect, the one or more luma threshold values are one of a first average of the multiple neighboring down-sampled values and a second average of multiple gradient neighboring values when the number of the multiple model groups is equal to two, and each of the multiple neighboring down-sampled values is applied to a gradient filter to generate the multiple gradient neighboring values.

An implementation of the first aspect further includes determining multiple luma down-sampled values by applying the multiple luma reconstructed samples to a down-sampling filter; comparing a specific one of the luma down-sampled values with the one or more threshold values to determine whether a sample value of the specific one of the luma down-sampled values is included in a specific one of the multiple model groups; determining a specific one of the multiple luma square values and a specific one of the multiple luma gradient values based on the specific one of the luma down-sampled values; and applying the specific one of the multiple luma square values and the specific one of the multiple luma gradient values to a specific one of the multiple non-linear model filters corresponding to the specific one of the multiple model groups.

In a second aspect of the present disclosure, a method of decoding video data and an electronic device for performing the method are provided. The method includes receiving the video data; determining a block unit from a current frame included in the video data; determining multiple luma reconstructed values in a luma block of the block unit based on the video data; determining a prediction model filter of a prediction model mode for a chroma block of the block unit based on the video data; determining a first value set including multiple first luma values and a second value set including multiple second luma values based on the multiple luma reconstructed values, wherein: at least one of the first value set or the second value set is generated by applying the multiple luma reconstructed values to a corresponding one of multiple gradient filters, and at least one of the first value set or the second value set is generated by squaring the multiple luma reconstructed values or multiple luma intermediate values generated from the multiple luma reconstructed values; and reconstructing the chroma block of the block unit by applying the multiple first luma values and the multiple second luma values to the prediction model filter.

In an implementation of the second aspect, the multiple first luma values include multiple luma squared gradient values generated by applying the multiple luma reconstructed values to the one of the multiple gradient filters to generate the multiple luma intermediate values and further squaring the multiple luma intermediate values, and the multiple second luma values are equal to the multiple luma reconstructed values.

In an implementation of the second aspect, the multiple first luma values are multiple luma squared gradient values generated by applying the multiple luma reconstructed values to the one of the multiple gradient filters to generate the multiple luma intermediate values and further squaring the multiple luma intermediate values, and the multiple second luma values are equal to the multiple luma intermediate values.

In an implementation of the second aspect, the multiple first luma values include multiple luma squared values generated by squaring the multiple luma reconstructed values, and the multiple second luma values include multiple luma gradient values generated by applying the multiple luma reconstructed values to the one of the multiple gradient filters.

An implementation of the second aspect further includes determining a reference region neighboring the block unit; determining multiple luma neighboring samples and multiple chroma neighboring samples of the reference region; determining a first filter parameter and a second filter parameter of the prediction model filter based on the multiple luma neighboring samples and the multiple chroma neighboring samples; and applying the multiple first luma values and the multiple second luma values to the prediction model filter by multiplying the multiple first luma values by the first filter parameter and multiplying the multiple second luma values by the second filter parameter.

In an implementation of the second aspect, the prediction model mode includes multiple non-linear model filters, the prediction model filter includes one of the multiple non-linear model filters, and each of the multiple non-linear model filters includes a first filter parameter and a second filter parameter.

An implementation of the second aspect further includes determining a reference region neighboring the block unit; determining multiple luma neighboring samples and multiple chroma neighboring samples of the reference region; determining multiple neighboring down-sampled values based on the luma neighboring samples; categorizing the multiple neighboring down-sampled values into multiple model groups based on one or more luma threshold values; categorizing the multiple chroma neighboring samples into the multiple model groups based on a distribution of the multiple neighboring down-sampled values in the multiple model groups; and determining the first filter parameter and the second filter parameter for each of the multiple non-linear model filters based on the multiple neighboring down-sampled values and the multiple chroma neighboring samples in a corresponding one of the multiple model groups.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
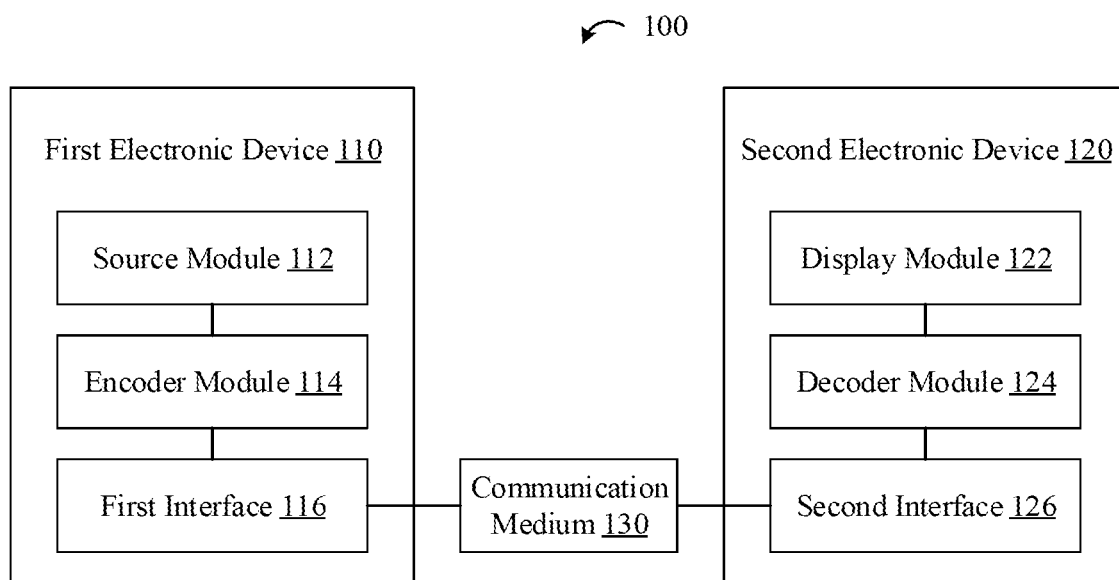
FIG. 1 is a block diagram illustrating a system having a first electronic device and a second electronic device for encoding and decoding video data, in accordance with one or more example implementations of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, like features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions. The computer-readable medium may be a non-transitory computer-readable medium.

FIG. 1 is a block diagram illustrating a system 100 having a first electronic device and a second electronic device for encoding and decoding video data, in accordance with one or more example implementations of this disclosure.

The system 100 includes a first electronic device 110, a second electronic device 120, and a communication medium 130.

The first electronic device 110 may be a source device including any device configured to encode video data and transmit encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the computer-executable instructions in hardware using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit and/or store a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure that may be used to interconnect peer devices.

The display module 122 may include a display using liquid crystal display (LCD) technology, plasma display technology, organic light emitting diode (OLED) display technology, or light-emitting polymer display (LPD) technology, with other display technologies used in other implementations. The display module 122 may include a high-definition display or an ultra-high-definition display.

Figure 2:
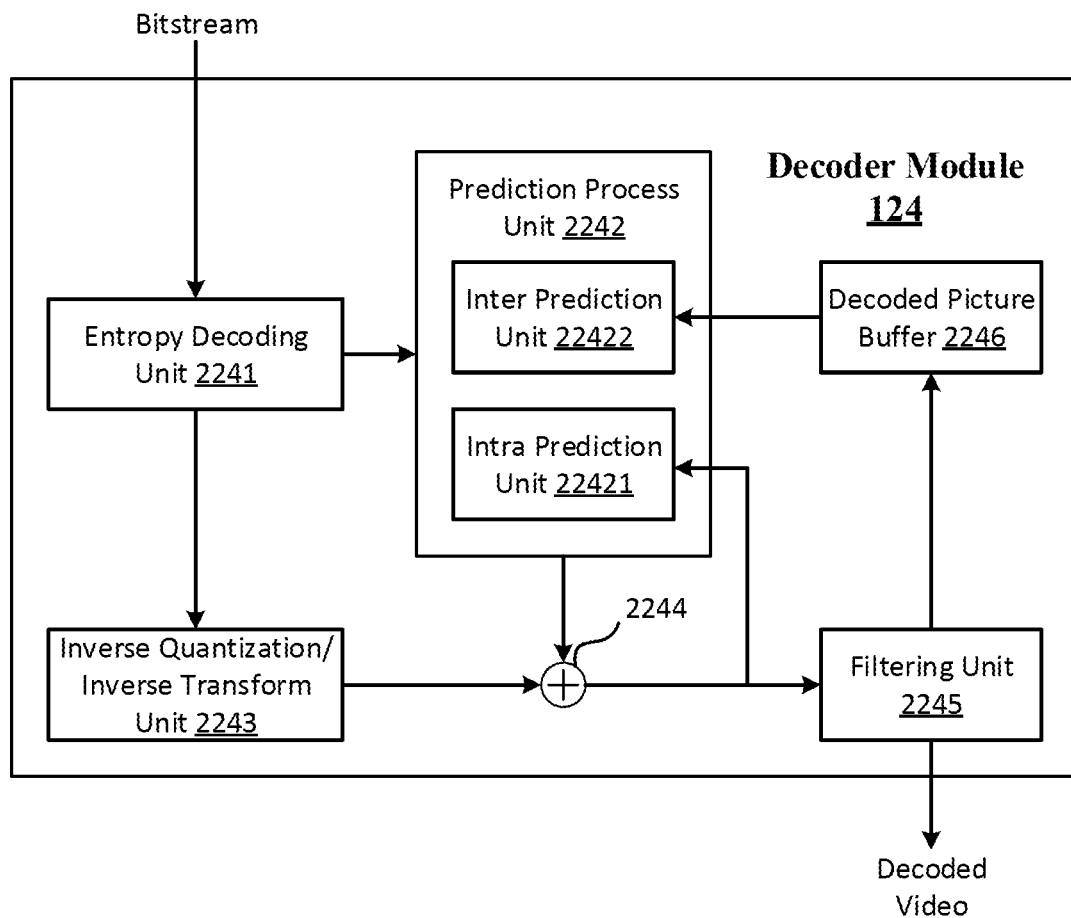
FIG. 2 is a block diagram illustrating a decoder module of the second electronic device illustrated in FIG. 1, in accordance with one or more example implementations of this disclosure.

FIG. 2 is a block diagram illustrating a decoder module 124 of the second electronic device 120 illustrated in FIG. 1, in accordance with one or more example implementations of this disclosure. The decoder module 124 may include an entropy decoder (e.g., an entropy decoding unit 2241), a prediction processor (e.g., a prediction process unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction process unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including a plurality of syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

The prediction process unit 2242 may receive syntax elements, such as motion vectors, intra modes, partition information, and other syntax information, from the entropy decoding unit 2241. The prediction process unit 2242 may receive the syntax elements including the partition information and divide image frames according to the partition information.

Each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or other equivalent coding units.

During the decoding process, the prediction process unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct a plurality of chroma components of the current block unit based on a plurality of luma components of the current block unit when the plurality of chroma components is reconstructed by the prediction process unit 2242.

The intra prediction unit 22421 may reconstruct a plurality of chroma components of the current block unit based on the plurality of luma components of the current block unit when the plurality of luma components of the current block unit is reconstructed by the prediction process unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit may be a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as discrete cosine transform (DCT), discrete sine transform (DST), adaptive multiple transform (AMT), mode-dependent non-separable secondary transform (MDNSST), Hypercube-Givens transform (HyGT), signal-dependent transform, Karhunen-Loeve transform (KLT), wavelet transform, integer transform, sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block to the predicted block provided from the prediction process unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter, and the ALF. Such filters are not explicitly illustrated for brevity but may filter the output of the summer 2244. The filtering unit 2245 may output the decoded video to the display module 122 or other video receiving unit after the filtering unit 2245 performs the filtering process for the reconstructed blocks of the specific image frame.

The decoded picture buffer 2246 may be a reference picture memory that stores the reference block for use by the prediction process unit 2242 in decoding the bitstream (in inter coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
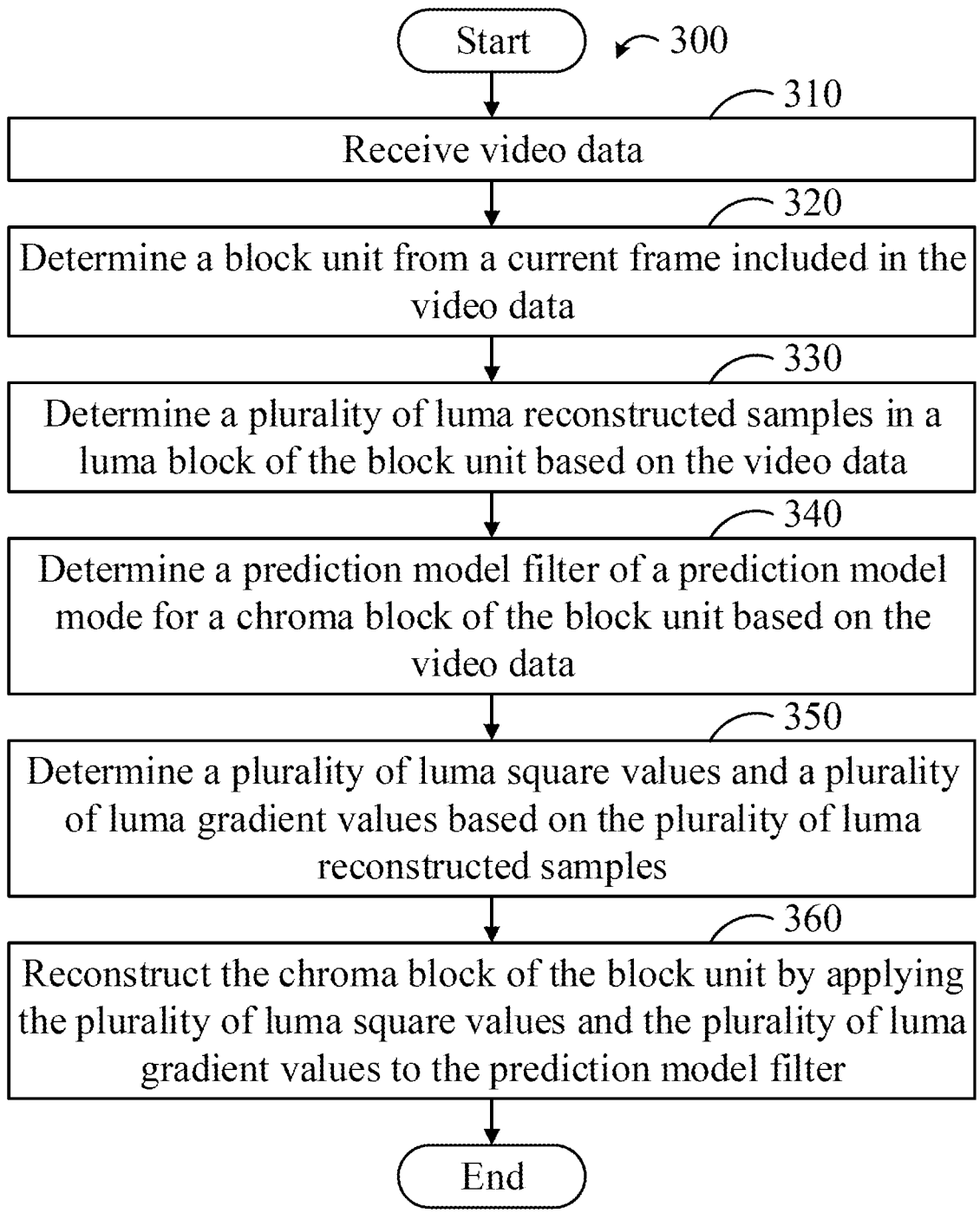
FIG. 3 is a flowchart illustrating a method/process for decoding and/or encoding video data by an electronic device, in accordance with one or more example implementations of this disclosure.

FIG. 3 is a flowchart illustrating a method/process 300 for decoding and/or encoding video data by an electronic device, in accordance with one or more example implementations of this disclosure. The method/process 300 is an example implementation, as there are a variety of ways of decoding the video data.

The method/process 300 may be performed by an electronic device using the configurations illustrated in FIGS. 1 and 2, and various elements of these figures are referenced with the description of the method/process 300. Each block illustrated in FIG. 3 may represent one or more processes, methods, or subroutines performed by an electronic device.

The order in which the blocks appear in FIG. 3 is for illustration only, and may not be intended to limit the scope of the present disclosure, thus may change in different implementations. Additional blocks may be added or fewer blocks may be utilized without departing from the present disclosure.

At block 310, the method/process 300 may start by the decoder module 124 receiving the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

The bitstream may include a plurality of prediction indications and a plurality of partitioning indications for a plurality of image frames. Then, the decoder module 124 may further reconstruct the plurality of image frames based on the prediction indications and the partitioning indications. The prediction indications and the partitioning indications may include a plurality of flags and a plurality of indices.

At block 320, the decoder module 124 determines a block unit from a current frame included in the video data.

With reference to FIGS. 1 and 2, the decoder module 124 may determine the image frames included in the bitstream when the video data received by the decoder module 124 is the bitstream. The current frame may be one of the image frames determined according to the bitstream. The decoder module 124 may further divide the current frame to determine the block unit according to the partition indications in the bitstream. For example, the decoder module 124 may divide the current frame to generate a plurality of CTUs, and further divide one of the CTUs to determine the block unit according to the partition indications based on any video coding standard.

The one of the CTUs for determining the block unit may include a luma coding tree block (CTB) and at least one chroma CTB. In some implementations, the at least one chroma CTB may be two chroma CTBs (e.g., a Cr CTB and a Cb CTB). The luma CTB may be divided into one or more luma coding units, and each of the at least one chroma CTB may be divided into one or more chroma coding units. A luma partitioning structure of the one or more luma coding units in the luma CTB may be identical to or different from a chroma partitioning structure of the one or more chroma coding units in each of the at least one chroma CTB. When a specific one of the one or more chroma coding units in one of the at least one chroma CTB is reconstructed based on the one or more luma coding units in the luma CTB, a block region in the one of the CTUs corresponding to the specific one of the one or more chroma coding units may be regarded as the block unit.

At block 330, the decoder module 124 determines a plurality of luma reconstructed samples in a luma block of the block unit based on the video data.

When the luma partitioning structure of the luma coding units in the luma CTB is identical to the chroma partitioning structure of the chroma coding units in the one of the at least one chroma CTB, a specific one of the luma coding units corresponding to the specific one of the chroma coding units may be determined as the luma block of the block unit. When the luma partitioning structure of the luma coding units in the luma CTB is different from the chroma partitioning structure of the chroma coding units in the one of the at least one chroma CTB, at least one of the luma coding units corresponding to the specific one of the chroma coding units may be used to determine as the luma block of the block unit. In other words, the luma block may include only one of the luma coding units when a block region in the one of the CTUs corresponding to the specific one of the chroma coding units is included in or identical to a block region in the one of the CTUs corresponding to the one of the luma coding units. In addition, the luma block may include more than one of the luma coding units when the block region in the one of the CTUs corresponding to the specific one of the chroma coding units is included in more than one block region in the one of the CTUs corresponding to the more than one of the luma coding units.

With reference to FIGS. 1 and 2, the luma block may be reconstructed prior to the reconstruction of the specific one of the chroma coding units. Thus, the decoder module 124 may directly receive a reconstructed result of the luma block reconstructed based on the video data when the decoder module 124 is reconstructing the chroma block. The decoder module 124 may directly determine the luma reconstructed samples in the luma block based on the reconstructed result determined for the specific one of the luma coding units when the luma partitioning structure of the luma coding units in the luma CTB is identical to the chroma partitioning structure of the chroma coding units in the one of the at least one chroma CTB. In addition, the decoder module 124 may directly determine the luma reconstructed samples in the luma block based on the reconstructed result determined for the at least one of the luma coding units when the luma partitioning structure of the luma coding units in the luma CTB is different from the chroma partitioning structure of the chroma coding units in the one of the at least one chroma CTB.

At block 340, the decoder module 124 determines a prediction model filter of a prediction model mode for a chroma block of the block unit based on the video data.

With reference to FIGS. 1 and 2, when the chroma block of the block unit is reconstructed based on the luma block of the block unit, the decoder module 124 may determine the prediction model filter of the prediction model mode based on a reference region of the block unit neighboring the block unit. The reference region may include at least one of a plurality of neighboring regions.

Figure 4:
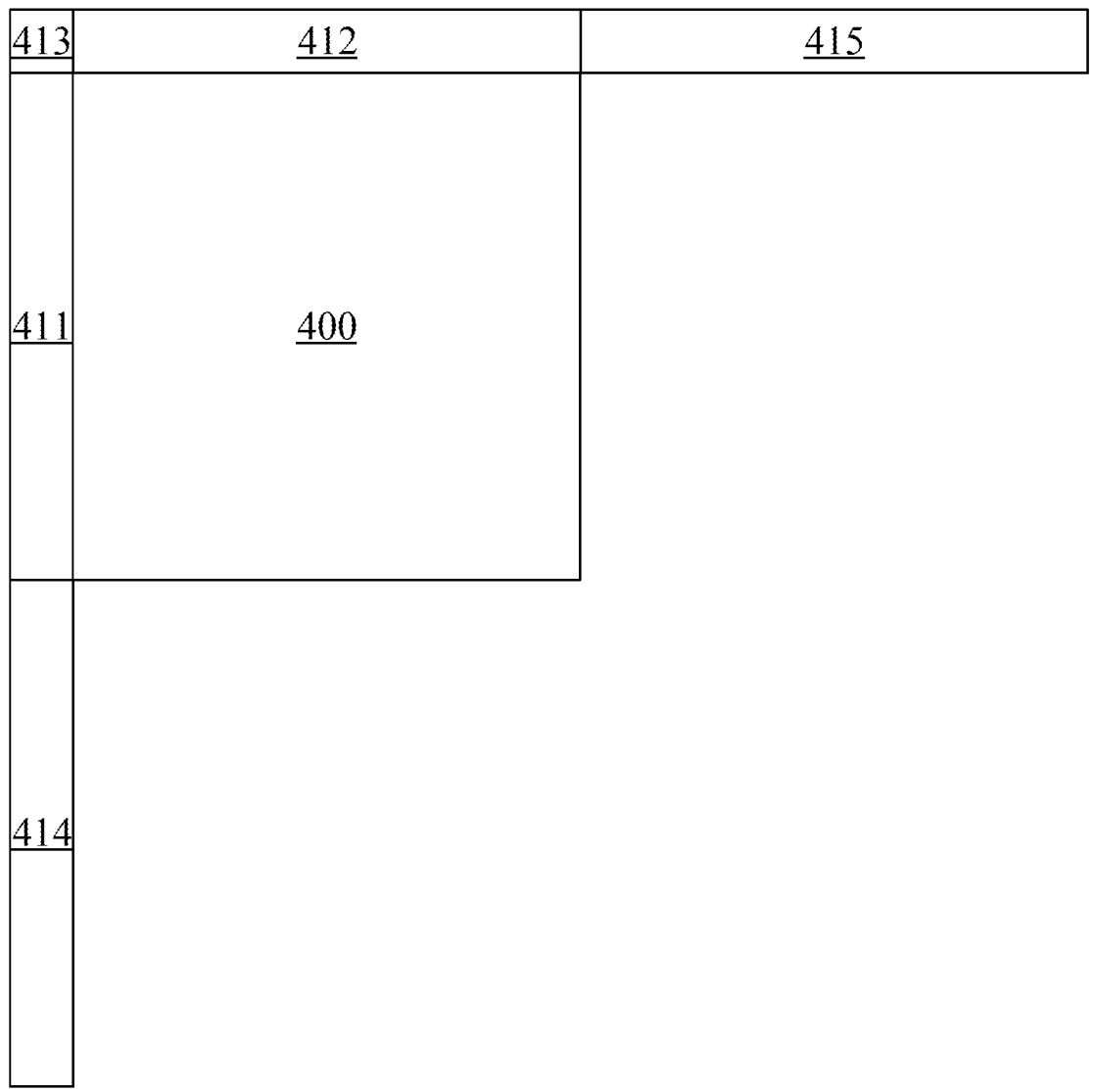
FIG. 4 illustrates an example implementation of a block unit and a plurality of neighboring regions, in accordance with one or more example implementations of this disclosure.

FIG. 4 illustrates an example implementation of a block unit 400 and a plurality of neighboring regions 411-415, in accordance with one or more example implementations of this disclosure. A first neighboring region may be a left neighboring region 411 located at a left side of the block unit 400, a second neighboring region may be an above neighboring region 412 located above the block unit 400, a third neighboring region may be an above-left neighboring region 413 located at a top-left side of the block unit 400, a fourth neighboring region may be a bottom-left neighboring region 414 located at a bottom-left side of the block unit 400, and a fifth neighboring region may be an above-right neighboring region 415 located at an above-right side of the block unit 400. The neighboring regions 411-415 may be reconstructed prior to the reconstruction of the block unit 400.

A height of the left neighboring region 411 may be equal to a height H (being a positive integer) of the block unit 400, and a width of the left neighboring region 411 may be equal to a number S (being a positive integer) of the luma reconstructed samples of the left neighboring region 411 along a horizontal direction. A height of the above neighboring region 412 may be equal to a number R (being a positive integer) of the luma reconstructed samples of the above neighboring region 412 along a vertical direction, and a width of the above neighboring region 412 may be equal to a width W (being a positive integer) of the block unit 400. In addition, a height of the above-left neighboring region 413 may be equal to the number R of the luma reconstructed samples of the above neighboring region 412 along the vertical direction, and a width of the above-left neighboring region 413 may be equal to the number S of the luma reconstructed samples of the left neighboring region 411 along the horizontal direction. A width of the bottom-left neighboring region 414 may be equal to the number S of the luma reconstructed samples of the left neighboring region 411 along the horizontal direction, and a height of the bottom-left neighboring region 414 may be equal to one of the width W and the height H of the block unit 400. A width of the above-right neighboring region 415 may be equal to one of the width W and the height H of the block unit 400, and a height of the above-right neighboring region 415 may be equal to the number R of the luma reconstructed samples of the above neighboring region 412 along the vertical direction. In some implementations, the numbers R and S may be positive integers (e.g., 1, 2, etc.) that may be equal to, or different from, each other. In some implementations, the height of the bottom-left neighboring region 414 may be equal to or greater than the width W and the height H of the block unit 400. In some implementations, the width of the above-right neighboring region 415 may be equal to or greater than the width W and the height H of the block unit 400.

The decoder module 124 may use at least one of the neighboring regions 411-415, as the reference region to determine the prediction model filter of the prediction model mode for predicting the chroma block of the block unit 400. In some implementations, the decoder module 124 may use all of the neighboring regions 411-415, as the reference region to determine the prediction model filter. In some implementations, the decoder module 124 may use four of the neighboring regions 411-415, as the reference region to determine the prediction model filter. For example, the decoder module 124 may use the neighboring regions 411, 412, 414, and 415, as the reference region. In some implementations, the decoder module 124 may use three of the neighboring regions 411-415, as the reference region. For example, the decoder module 124 may use the neighboring regions 411-413, as the reference region. In some implementations, the decoder module 124 may use two of the neighboring regions 411-415, as the reference region. For example, the decoder module 124 may use the neighboring regions 411 and 414, as the reference region. In some implementations, the decoder module 124 may use only one of the neighboring regions 411-415, as the reference region. For example, the decoder module 124 may use the neighboring region 411, as the reference region.

Since the reference region may be reconstructed prior to the reconstruction of the block unit 400, the decoder module 124 may directly receive a reconstructed result of the reference region. Thus, the decoder module 124 may directly determine a luma reference region including a plurality of luma neighboring samples of the reference region and a chroma reference region including a plurality of chroma neighboring samples of the reference region based on the reconstructed result of the reference region and determine a first filter parameter, a second filter parameter, and any other filter parameters of the prediction model filter based on the luma neighboring samples and the chroma neighboring samples.

In some implementations, the prediction model filter of the prediction model mode for the chroma reference region may be determined based on the following equation:

$$nP_C(i,j) = \alpha \times [nF(i,j)]^2 + \beta \times [nS(i,j)] + \gamma$$

In the above equation, $\alpha$, $\beta$, and $\gamma$ may be the first to third filter parameters of the chroma reference region, $nP_C(i,j)$ may be a chroma predicted block of the chroma reference region predicted by using a plurality of luma neighboring values based on the prediction model filter, $[nF(i,j)]^2$ may be a first reference set including a plurality of first luma references generated based on the luma neighboring values, and $[nS(i,j)]$ may be a second reference set including a plurality of second luma references generated based on the luma neighboring values. In some implementations, the luma neighboring values may be the luma neighboring samples. In some implementations, the luma neighboring values may be a plurality of neighboring down-sampled values generated by applying the luma neighboring samples to a down-sampling filter. Thus, in some such implementations, the neighboring down-sampled values may be determined based on the luma neighboring samples.

In some implementations, the second reference set, $[nS(i,j)]$, may be a gradient reference set, $[nG(i,j)]$, including a plurality of gradient neighboring values generated by applying the luma neighboring values to a gradient filter, and the first reference set, $[nF(i,j)]^2$, may be a square gradient reference set, $[nG(i,j)]^2$, including a plurality of square gradient neighboring values generated by squaring each of the gradient neighboring values. Thus, in some such implementations, the prediction model filter of the prediction model mode for the chroma reference region may be determined, as follows:

$$nP_C(i,j)=\alpha \times [nG(i,j)]^2+\beta \times [nG(i,j)]+\gamma$$

In some implementations, the second reference set, [nS(i,j)], may be the gradient reference set, [nG(i,j)], including the gradient neighboring values generated by applying the luma neighboring values to the gradient filter, and the first reference set, $[nF(i,j)]^2$, may be a square reference set, $[nL(i,j)]^2$, including a plurality of square neighboring values generated by squaring each of the luma neighboring values. Thus, the prediction model filter of the prediction model mode for the chroma reference region may be determined, as follows:

$$nP_C(i,j)=\alpha \times [nL(i,j)]^2+\beta \times [nG(i,j)]+\gamma$$

In some implementations, the prediction model filter may be determined, as follows:

$$nP_C(i,j)=c_0[nL(i,j)]+c_1[nG_Y(i,j)]+c_2[nG_X(i,j)]+c_3Y+ \\ c_4X+c_5\{[nL^2(i,j)-\text{midVal}]>>\text{bitDepth}\}+c_6B$$

In the above equation, $c_0$-$c_6$ may be the first to sixth filter parameters of the chroma reference region, [nL(i,j)] may be a luma reference set including the luma neighboring values, $[nG_Y(i,j)]$ may be a vertical gradient neighboring set including a plurality of vertical gradient neighboring values generated by applying the luma neighboring values to a vertical gradient filter, $[nG_X(i,j)]$ may be a horizontal gradient neighboring set including a plurality of horizontal gradient neighboring values generated by applying the luma neighboring values to a horizontal gradient filter, the parameters, Y and X, may be vertical and horizontal locations of the luma neighboring values, the parameter, midVal, may be equal to a mid-value of the luma neighboring values, the parameter, bitDepth, may be the bit depth of the current frame, and the bias term, B, may represent a scalar offset and is set to middle chroma value (512 for 10-bit content).

In some implementations, the second reference set, [nS(i,j)], may be the luma reference set, [nL(i,j)], including the luma neighboring values, and the first reference set, $[nF(i,j)]^2$, may be the square gradient reference set, $[nG(i,j)]^2$, including the square gradient neighboring values generated by squaring each of the gradient neighboring values. Thus, the prediction model filter of the prediction model mode for the chroma reference region may be determined, as follows:

$$nP_C(i,j)=\alpha \times [nG(i,j)]^2+\beta \times [nL(i,j)]+\gamma$$

The first to the third filter parameters, $\alpha$, $\beta$, and $\gamma$, of the prediction model filter may be determined based on the luma neighboring samples and the chroma neighboring samples. In some implementations, the luma neighboring samples of the luma reference region and the chroma neighboring samples of the chroma reference region may be directly used to calculate the first to the third filter parameters, $\alpha$, $\beta$, and $\gamma$. In some implementations, the neighboring down-sampled values of the luma reference region and the chroma neighboring samples of the chroma reference region may be used to calculate the filter parameters, $\alpha$, $\beta$, and $\gamma$. In some implementations, the gradient filter may be one of a plurality of plurality of gradient filter candidates determined, as follows:

$$\begin{bmatrix} 1 & 0 & -1 \\ 1 & 0 & -1 \end{bmatrix}, \begin{bmatrix} 1 & 2 & 1 \\ -1 & 2 & -1 \end{bmatrix}, \begin{bmatrix} 2 & 1 & -1 \\ 1 & -1 & -2 \end{bmatrix}, \begin{bmatrix} -1 & 1 & 2 \\ -2 & -1 & 1 \end{bmatrix},$$

$$\begin{bmatrix} 0 & 2 & -2 \\ 0 & 1 & -1 \end{bmatrix}, \begin{bmatrix} 1 & 1 & 1 \\ -1 & -1 & -1 \end{bmatrix}, \begin{bmatrix} 1 & 1 & -1 \\ 1 & -1 & -1 \end{bmatrix}, \begin{bmatrix} -1 & 1 & 1 \\ -1 & -1 & 1 \end{bmatrix},$$

$$\begin{bmatrix} 0 & 1 & -1 \\ 0 & 1 & -1 \end{bmatrix}, \begin{bmatrix} 0 & 1 & 1 \\ 0 & -1 & -1 \end{bmatrix}, \begin{bmatrix} 1 & 1 & 0 \\ 0 & -1 & -1 \end{bmatrix}, \begin{bmatrix} 0 & 1 & 1 \\ -1 & -1 & 0 \end{bmatrix},$$

$$\begin{bmatrix} 1 & -1 & 0 \\ 1 & -1 & 0 \end{bmatrix}, \begin{bmatrix} 1 & 1 & 0 \\ -1 & -1 & 0 \end{bmatrix}, \begin{bmatrix} 1 & 2 & 0 \\ 0 & -2 & -1 \end{bmatrix}, \begin{bmatrix} 0 & 2 & 1 \\ -1 & -2 & 0 \end{bmatrix},$$

$$\begin{bmatrix} 1 & 0 & -1 \\ 2 & 0 & -2 \\ 1 & 0 & -1 \end{bmatrix}, \begin{bmatrix} 1 & 2 & 1 \\ 0 & 0 & 0 \\ -1 & -2 & -1 \end{bmatrix}$$

In some implementations, the gradient filter may be one of a vertical gradient filter and a horizontal gradient filter. For example, the vertical gradient filter may be the gradient filter candidate $$\begin{bmatrix} 1 & 0 & -1 \\ 2 & 0 & -2 \\ 1 & 0 & -1 \end{bmatrix},$$

and the horizontal gradient filter may be the gradient filter candidate $$\begin{bmatrix} 1 & 2 & 1 \\ 0 & 0 & 0 \\ -1 & -2 & -1 \end{bmatrix}.$$

In some implementations, the luma neighboring samples may be directly applied to the gradient filter to generate the gradient reference set, [nG(i,j)], as the second reference set, [nS(i,j)], when the video data is non-subsampled data (i.e., having a 4:4:4 chroma subsampling scheme). In some implementations, the luma neighboring samples may be directly applied to the gradient filter to generate the gradient reference set, [nG(i,j)], as the second reference set, [nS(i,j)], when the video data is subsampled data (i.e., having a 4:2:2 chroma subsampling scheme or a 4:2:0 chroma subsampling scheme) and a filter function of the gradient filter may include a filter function of the down-sampling filter. In some implementations, the neighboring down-sampled values may be applied to the gradient filter to generate the gradient reference set, [nG(i,j)], as the second reference set, [nS(i,j)], when the video data is the subsampled data and the filter function of the gradient filter does not include the filter function of the down-sampling filter.

In some implementations, the luma neighboring samples may be directly applied to the gradient filter and then squared to generate the square gradient reference set, $[nG(i,j)]^2$, as the first reference set, $[nF(i,j)]^2$, when the video data is the non-subsampled data. In some implementations, the luma neighboring samples may be directly applied to the gradient filter and then squared to generate the square gradient reference set, $[nG(i,j)]^2$, as the first reference set, $[nF(i,j)]^2$, when the video data is the subsampled data and the filter function of the gradient filter may include the filter function of the down-sampling filter. In some implementations, the neighboring down-sampled values may be applied to the gradient filter and then squared to generate the square gradient reference set, $[nG(i,j)]^2$, as the first reference set, $[nF(i,j)]^2$, when the video data is the subsampled data and the filter function of the gradient filter does not include the filter function of the down-sampling filter.

In some implementations, the luma reference set, [nL(i, j)], may include the neighboring down-sampled values and be set as the second reference set, [nS(i,j)], when the video data is the subsampled data. In some implementations, the luma reference set, [nL(i,j)], may include the luma neighboring samples and be set as the second reference set, [nS(i,j)], when the video data is non-subsampled data. In some implementations, the neighboring down-sampled values may be squared to generate the square reference set, $[nL(i,j)]^2$, as the first reference set, $[nF(i,j)]^2$, when the video data is the subsampled data. In some implementations, the luma neighboring samples may be squared to generate the square reference set, $[nL(i,j)]^2$, as the first reference set, $[nF(i,j)]^2$, when the video data is the non-subsampled data.

The decoder module 124 (as shown in FIG. 2) may determine a cost value between a chroma reconstructed block of the chroma reference region, including the chroma neighboring samples, and each of the chroma predicted blocks of the chroma reference region generated by applying the luma neighboring values of the luma reference region to the prediction model filter of the prediction model mode. Each of the cost values may be calculated based on a difference between the chroma reconstructed block of the chroma reference region and one of the chroma predicted blocks of the chroma reference region. The one of the chroma predicted blocks of the chroma reference region may include a plurality of chroma neighboring predicted samples of the chroma reference region generated by applying the luma neighboring values of the luma reference region to the prediction model filter. Thus, the cost value may be determined by comparing the chroma neighboring samples of the chroma reference region with the chroma neighboring predicted samples of the chroma reference region.

The difference between the chroma neighboring samples and the chroma neighboring predicted samples of the chroma reference region may be calculated based on a Mean Squared Error (MSE) calculation. In addition, the difference between the chroma neighboring samples and the chroma neighboring predicted samples of the chroma reference region may be calculated based on a Sum of Absolute Difference (SAD) calculation. In some implementations, the chroma neighboring samples and the chroma neighboring predicted samples of the chroma reference region may be calculated based on a Sum of Absolute Transformed Difference (SATD) calculation. Each of the differences generated by calculating between the chroma neighboring samples and the chroma neighboring predicted samples of the chroma reference region may be regarded as the cost value.

In some implementations, a minimization cost may be performed by calculating an autocorrelation matrix for the luma input and a cross-correlation vector between the luma input and the chroma output. The autocorrelation matrix may be LDL decomposed and the plurality of non-linear model parameters may be calculated using a back-substitution. In some implementations, the decomposition may be a Cholesky decomposition.

Referring back to FIG. 3, at block 350, the decoder module 124 determines a plurality of luma square values and a plurality of luma gradient values based on the plurality of luma reconstructed samples.

The determination schemes of the luma square values and the luma gradient values of the luma block, in some implementations, may be identical to those of the first luma references in the first reference set, $[nF(i,j)]^2$, and the second luma references in the second reference set, [nS(i,j)]. In addition, the luma reconstructed samples of the luma block may be applied to the down-sampling filter to generate a plurality of luma down-sampled values of the luma block.

In some implementations, the luma gradient values of the luma block may be included in a luma gradient set, [G(i,j)], and generated by applying the luma reconstructed samples of the luma block to the gradient filter when the second reference set, [nS(i,j)], is the gradient reference set, [nG(i,j)], generated by applying the luma neighboring samples to the gradient filter. In addition, the luma square values may be included in a luma square gradient set, $[G(i,j)]^2$, and generated by applying the luma reconstructed samples of the luma block to the gradient filter to generate a plurality of luma intermediate values and squaring each of the luma intermediate values when the first reference set, $[nF(i,j)]^2$, is the square gradient reference set, $[nG(i,j)]^2$, generated by applying the luma neighboring samples to the gradient filter to generate the gradient neighboring values and then squaring each of the gradient neighboring values.

In some implementations, the luma gradient values of the luma block may be included in the luma gradient set, [G(i,j)], and generated by applying the luma down-sampled values of the luma block to the gradient filter when the second reference set, [nS(i,j)], is the gradient reference set, [nG(i,j)], generated by applying the neighboring down-sampled values to the gradient filter. Thus, each of the luma down-sampled values may be applied to the gradient filter to generate the plurality of luma gradient values. In addition, the luma square values may be included in the luma square gradient set, $[G(i,j)]^2$, and generated by applying the luma down-sampled values of the luma block to the gradient filter to generate the luma intermediate values and squaring each of the luma intermediate values when the first reference set, $[nF(i,j)]^2$, is the square gradient reference set, $[nG(i,j)]^2$, generated by applying the neighboring down-sampled values to the gradient filter and then squaring.

In some implementations, the luma gradient values of the luma block may be included in the luma gradient set, [G(i,j)], and generated by applying the luma reconstructed samples of the luma block to the gradient filter when the second reference set, [nS(i,j)], is the gradient reference set, [nG(i,j)], generated by applying the luma neighboring samples to the gradient filter. In addition, the luma square values may be included in a luma square set, $[L(i,j)]^2$, and generated by squaring each the luma reconstructed samples of the luma block when the first reference set, $[nF(i,j)]^2$, is the square reference set, $[nL(i,j)]^2$, generated by squaring each of the luma neighboring samples.

In some implementations, the luma gradient values of the luma block may be included in the luma gradient set, [G(i,j)], and generated by applying the luma down-sampled values of the luma block to the gradient filter when the second reference set, [nS(i,j)], is the gradient reference set, [nG(i,j)], generated by applying the neighboring down-sampled values to the gradient filter. In addition, the luma square values may be included in the luma square set, $[L(i,j)]^2$, and generated by squaring each of the luma down-sampled values of the luma block when the first reference set, $[nF(i,j)]^2$, is the square reference set, $[nL(i,j)]^2$, generated by squaring each of the neighboring down-sampled values.

In some implementations, the luma reconstructed samples of the luma block may be included in a luma reconstructed set, [L(i,j)], directly used for predicting the chroma block when the luma reference set, [nL(i,j)], including the luma neighboring samples may be set as the second reference set, [nS(i,j)]. In addition, the luma square gradient values of the luma block generated based on the luma reconstructed values and included in the luma square gradient set, $[G(i,j)]^2$, may be regarded as the luma square values of the luma block for predicting the chroma block and also regarded as the luma gradient values of the luma block for predicting the chroma block when the first reference set, $[nF(i,j)]^2$, is the square gradient reference set, $[nG(i,j)]^2$, generated by applying the luma neighboring samples to the gradient filter and then squared.

In some implementations, the luma down-sampled values of the luma block may be included in the luma reconstructed set, $[L(i,j)]$, directly used for predicting the chroma block when the luma reference set, $[nL(i,j)]$, including the neighboring down-sampled values may be set as the second reference set, $[nS(i,j)]$. In addition, the luma square gradient values of the luma block generated based on the luma down-sampled values and included in the luma square gradient set, $[G(i,j)]^2$, may be regarded as the luma square values of the luma block for predicting the chroma block and also regarded as the luma gradient values of the luma block for predicting the chroma block when the first reference set, $[nF(i,j)]^2$, is the square gradient reference set, $[nG(i,j)]^2$, generated by applying the neighboring down-sampled values to the gradient filter and then squared.

Referring back to FIG. 3, at block 360, the decoder module 124 reconstructs the chroma block of the block unit by applying the plurality of luma square values and the plurality of luma gradient values to the prediction model filter.

In some implementations, the prediction model filter of the prediction model mode for the chroma block may be determined, as follows:

$$P_C(i,j)=\alpha \times [F(i,j)]^2 + \beta \times [S(i,j)] + \gamma$$

In the above equation, $\alpha$, $\beta$, and $\gamma$ may be the first to the third filter parameters of the chroma block identical to the filter parameters of the chroma reference region, $P_C(i,j)$ may be a chroma predicted block of the chroma block predicted by using a plurality of luma reconstructed values of the luma block based on the prediction model filter, $[F(i,j)]^2$ may be a first value set including a plurality of first luma values generated based on the luma reconstructed samples, and $[S(i,j)]$ may be a second value set including a second luma values generated based on the luma reconstructed samples. Thus, the chroma predicted block may be generated by applying the first luma values and the second luma values to the prediction model filter of the chroma block to multiply the first luma values by the first filter parameter, $\alpha$, and to multiply the second luma values by the second filter parameter, $\beta$.

In some implementations, the first luma values in the first value set and the second luma values in the second value set may be generated by calculating a plurality of luma reconstructed values and applied the luma reconstructed values to the prediction model filter to reconstruct the chroma block of the block unit. In some implementations, the luma reconstructed values may be the luma reconstructed samples. In some implementations, the luma reconstructed values may be the luma down-sampled values generated by applying the luma reconstructed samples to the down-sampling filter.

One or both of the first value set and the second value set may be generated by applying the luma reconstructed values to a corresponding one of a plurality of gradient filters. In addition, one or both of the first value set and the second value set may be generated by squaring the luma reconstructed values or the luma intermediate values generated from the plurality of luma reconstructed values.

In one implementation, both of the first value set and the second value set may be generated by applying the luma reconstructed samples or the luma down-sampled values to the gradient filter. In addition, the first value set may be also generated by squaring the luma intermediate values, but the second value set may not be generated by a square function. For example, the first luma values in the first value set may be the luma square gradient values in the luma square gradient set, $[G(i,j)]^2$, generated by applying the luma reconstructed samples or the luma down-sampled values of the luma block to the gradient filter to generate the luma intermediate values and squaring each of the luma intermediate values and the second luma values in the second value set may be the luma intermediate values in the luma gradient set, $[G(i,j)]$, generated by applying the luma reconstructed samples or the luma down-sampled values of the luma block to the gradient filter. Thus, the chroma predicted block may be generated by applying the luma square gradient values and the luma gradient values to the prediction model filter of the chroma block to multiply the luma square gradient values by the first filter parameter, $\alpha$, and to multiply the luma gradient values by the second filter parameter, $\beta$. The prediction model filter of the prediction model mode for the chroma block may be determined, as follows:

$$P_C(i,j)=\alpha \times [G(i,j)]^2 + \beta \times [G(i,j)] + \gamma$$

In one implementation, the second value set may be generated by applying the luma reconstructed samples or the luma down-sampled values to the gradient filter, but the first value set may not be generated by the gradient filter. In addition, the first value set may be generated by squaring the luma reconstructed samples or the luma down-sampled values, but the second value set may not be generated by the square function. For example, the first luma values in the first value set may be the luma square values in the luma square set, $[L(i,j)]^2$, generated by squaring each of the luma reconstructed samples or each of the luma down-sampled values of the luma block and the second luma values in the second value set may be the luma gradient values in the luma gradient set, $[G(i,j)]$, generated by applying the luma reconstructed samples or the luma down-sampled values of the luma block to the gradient filter. Thus, the chroma predicted block may be generated by applying the luma square values and the luma gradient values to the prediction model filter of the chroma block to multiply the luma square values by the first filter parameter, $\alpha$, and to multiply the luma gradient values by the second filter parameter, $\beta$. The prediction model filter of the prediction model mode for the chroma block may be determined, as follows:

$$P_C(i,j)=\alpha \times [L(i,j)]^2 + \beta \times [G(i,j)] + \gamma$$

In some implementations, the prediction model filter may be determined, as follows:

$$P_C(i,j)=c_0[L(i,j)]+c_1[G_Y(i,j)]+c_2[G_X(i,j)]+c_3Y+c_4X+\\c_5\{[L^2(i,j)-\text{midVal}]\text{>>}\text{bitDepth}\}+c_6B$$

In the above equation, $c_0$-$c_6$ may be a first to a sixth filter parameters of the chroma block identical to the filter parameters of the chroma reference region, $[L(i,j)]$ may be a luma reconstructed set including the luma reconstructed values, $[G_Y(i,j)]$ may be a vertical gradient set including a vertical gradient values generated by applying the luma reconstructed values to the vertical gradient filter, $[G_X(i,j)]$ may be a horizontal gradient set including a horizontal gradient values generated by applying the luma reconstructed values to the horizontal gradient filter, the parameters, Y and X, may be vertical and horizontal locations of the luma reconstructed values, the parameter, midVal, may be equal to a mid-value of the luma reconstructed values, the parameter, bitDepth, may be the bit depth of the current frame, and the bias term, B, may represent a scalar offset and is set to middle chroma value (512 for 10-bit content).

In one implementation, the first value set may be generated by applying the luma reconstructed samples or the luma down-sampled values to the gradient filter, but the second value set may not be generated by the gradient filter. In addition, the first value set may be generated by squaring the luma intermediate values, but the second value set may not be generated by the square function. For example, the first luma values in the first value set may be the luma square gradient values in the luma square gradient set, $[G(i,j)]^2$, generated by applying the luma reconstructed samples or the luma down-sampled values of the luma block to the gradient filter to generate the luma intermediate values and squaring each of the luma intermediate values. In addition, the second luma values in the second value set may be the luma reconstructed samples or the luma down-sampled values in the luma reconstructed set, $[L(i,j)]$, generated without the gradient filter and the square function. Thus, the chroma predicted block may be generated by applying the luma square gradient values and the luma reconstructed values to the prediction model filter of the chroma block to multiply the luma square gradient values by the first filter parameter, $\alpha$, and to multiply the luma reconstructed values by the second filter parameter, $\beta$. The prediction model filter of the prediction model mode for the chroma block may be determined, as follows:

$$P_C(i,j) = \alpha \times [G(i,j)]^2 + \beta \times [L(i,j)] + \gamma$$

The decoder module 124 may generate the chroma predicted block based on the prediction model filter of the prediction model mode for the chroma block. Then, the decoder module 124 may further add a plurality of residual components into the chroma predicted block to reconstruct the chroma block. The residual components may be a plurality of chroma residual components determined based on the bitstream. The decoder module 124 may reconstruct all of the other chroma blocks in the current frame for reconstructing the current frame and the video data.

In some implementations, the prediction model mode of the chroma block may include a plurality of non-linear model filters. Thus, the previously mentioned prediction model filter of the prediction model mode may just be one of the non-linear model filters. The number of the non-linear model filters may be a positive integer equal to two, three, and more than three. Each of the non-linear model filters may include a first filter parameter, $\alpha$, a second filter parameter, $\beta$, and a third filter parameter, $\gamma$. For example, a first non-linear model filters may include a first filter parameter, $\alpha 1$, a second filter parameter, $\beta 1$, and a third filter parameter, $\gamma 1$, and a second non-linear model filters may include a first filter parameter, $\alpha 2$, a second filter parameter, $\beta 2$, and a third filter parameter, $\gamma 2$.

In some implementations, the decoder module 124 may calculate one or more threshold values based on the luma neighboring values. The one or more threshold values may be used to separate/divide the luma neighboring values into a plurality of model groups. In some implementations, the decoder module 124 may calculate the one or more threshold values based on the gradient neighboring values. The one or more threshold values may be used to separate/divide the gradient neighboring values into the model groups. The number of the model groups may be equal to the number of the non-linear model filters, and the number of the one or more threshold values may be equal to a value generated by subtracting one from the number of the model groups.

The one or more threshold values may be at least one of an average, a median, a quartile, or other values determined based on the luma neighboring samples, the neighboring down-sampled values, or the gradient neighboring values. In some implementations, when the number of the plurality of model groups is equal to two, the one or more threshold values may be an average of the neighboring down-sampled values. In some implementations, when the number of the plurality of model groups is equal to two, the one or more threshold values may be an average of the luma neighboring samples. In some implementations, when the number of the plurality of model groups is equal to two, the one or more threshold values may be an average of the gradient neighboring values. In some implementations, each of the luma neighboring samples may be applied to the gradient filter to generate the gradient neighboring values. In some implementations, each of the neighboring down-sampled values may be applied to the gradient filter to generate the gradient neighboring values.

The decoder module 124 may categorize the luma neighboring values into the model groups based on the one or more threshold values. In some implementations, the decoder module 124 may categorize the luma neighboring samples into the model groups based on the one or more threshold values. In some implementations, the decoder module 124 may categorize the neighboring down-sampled values into the model groups based on the one or more threshold values. In some implementations, the decoder module 124 may categorize the gradient neighboring values into the model groups based on the one or more threshold values.

The decoder module 124 may categorize the chroma neighboring samples into the plurality of model groups based on a distribution of the luma neighboring values in the model groups. In some implementations, the decoder module 124 may categorize the chroma neighboring samples into the model groups based on one of a first distribution of the luma neighboring samples in the model groups, a second distribution of the neighboring down-sampled values in the model groups, and a third distribution of the gradient neighboring values in the model groups. For example, when a specific one of the neighboring down-sampled values located at a sample location of the block unit is added to a specific one of the model groups, a specific one of the chroma neighboring samples located at the sample location of the block unit may be added to the specific one of the model groups. The specific one of the neighboring down-sampled values and the specific one of the chroma neighboring samples located at the same location may be added to the same model groups.

The decoder module 124 may determine different non-linear model filters for each of the model groups. Thus, the decoder module 124 may determine a first filter parameter, an, and a second filter parameter, $\beta n$, for each of the non-linear model filters based on the luma neighboring values and the chroma neighboring samples in a corresponding one of the plurality of model groups. For example, the decoder module 124 may determine the first filter parameter, $\alpha k$, and the second filter parameter, $\beta k$, for a k-th non-linear model filter based on the neighboring down-sampled values and the chroma neighboring samples in a k-th model group. In some implementations, the number, n, may be equal to the number of the plurality of model groups, and the number, k, may be a positive integer less than or equal to the number n.

The decoder module 124 may compare each of the luma reconstructed values with the one or more threshold values for checking a distribution of the luma reconstructed values in the model groups, and further determine the luma square values and the luma gradient values based on the luma reconstructed values. In addition, the decoder module 124 may apply the luma square values and the luma gradient values to the non-linear model filters based on the distribution of the luma reconstructed values for reconstructing the chroma block. In some implementations, the decoder module 124 may compare a specific one of the luma down-sampled values with the one or more threshold values to determine which model group the specific luma down-sampled value is included in, and further determine a specific one of the luma square values and a specific one of the luma gradient values based on the specific one of the luma down-sampled values. When the specific luma down-sampled value is included in a specific one of the model groups, the decoder module 124 may apply the specific luma square value and the specific luma gradient value to a specific one of the non-linear model filters corresponding to the specific model groups.

In some implementations, each of the non-linear model filters may include different gradient filters. Thus, when a specific one of the luma reconstructed values is applied to the gradient filters, the decoder module 124 may determine the specific model group of the specific luma reconstructed values and then determine a corresponding one of the gradient filter for the specific luma reconstructed values. The method/process 300 may then end.

Figure 5:
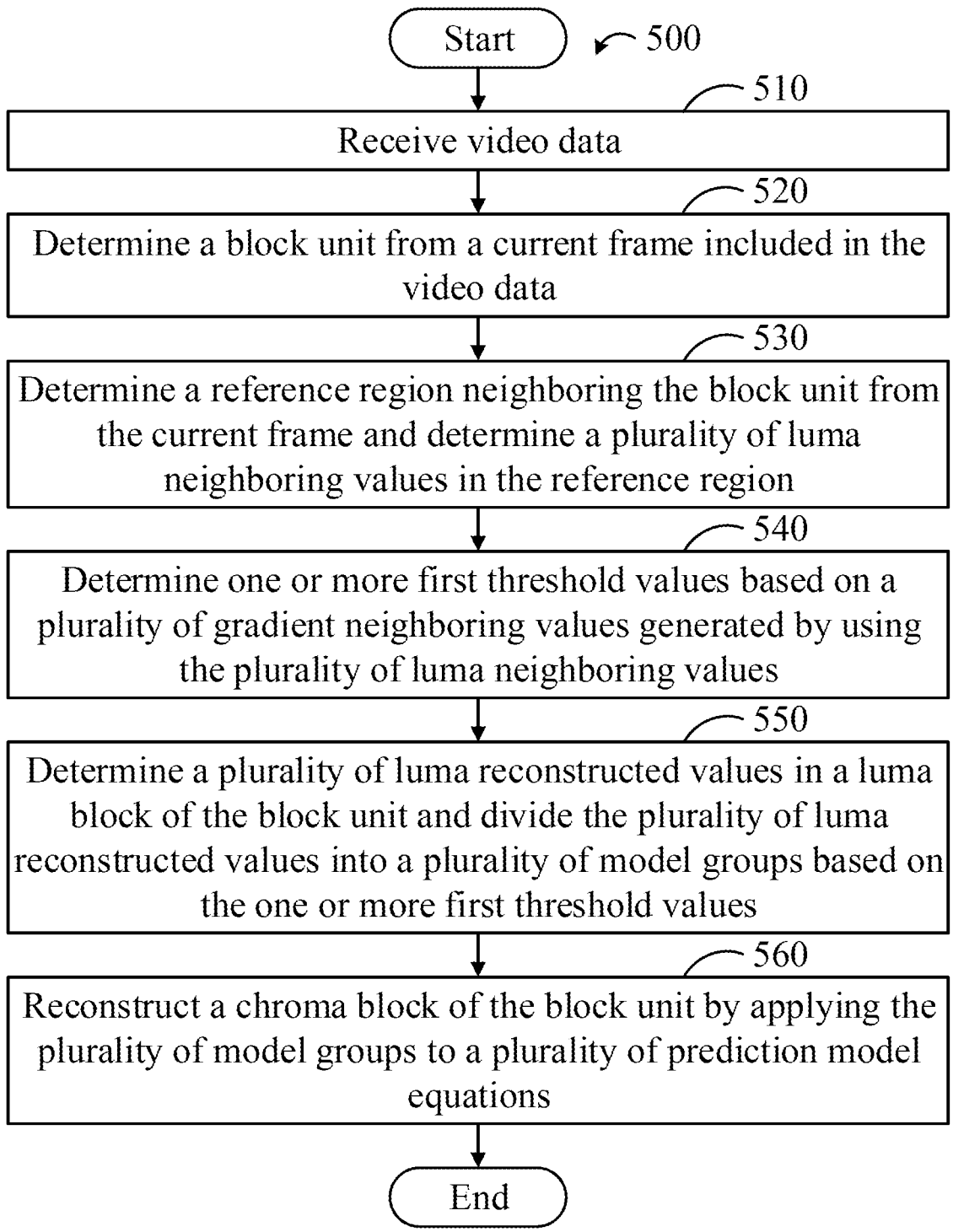
FIG. 5 is a flowchart illustrating a method/process for decoding and/or encoding video data by an electronic device, in accordance with one or more example implementations of this disclosure.

FIG. 5 is a flowchart illustrating a method/process 500 for decoding and/or encoding video data by an electronic device, in accordance with one or more example implementations of this disclosure. The method 500 is an example implementation, as there are a variety of ways of decoding the video data.

The method/process 500 may be performed by an electronic device using the configurations illustrated in FIGS. 1 and 2, and various elements of these figures are referenced with the description of the method/process 500. Each block illustrated in FIG. 5 may represent one or more processes, methods, or subroutines performed by an electronic device.

The order in which the blocks appear in FIG. 5 is for illustration only, and may not be intended to limit the scope of the present disclosure, thus may change in different implementations. Additional blocks may be added or fewer blocks may be utilized without departing from the present disclosure.

At block 510, the method/process 500 may start by the decoder module 124 receiving video data. The video data received by the decoder module 124 may include a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

The bitstream may include a plurality of prediction indications and a plurality of partitioning indications for a plurality of image frames. Then, the decoder module 124 may further reconstruct the plurality of image frames based on the prediction indications and the partitioning indications. The prediction indications and the partitioning indications may include a plurality of flags and a plurality of indices.

At block 520, the decoder module 124 determines a block unit from a current frame included in the video data.

With reference to FIGS. 1 and 2, the decoder module 124 may determine the image frames included in the bitstream when the video data received by the decoder module 124 is the bitstream. The current frame may be one of the image frames determined according to the bitstream. The decoder module 124 may further divide the current frame to determine the block unit according to the partition indications in the bitstream. For example, the decoder module 124 may divide the current frame to generate a plurality of CTUs, and further divide one of the CTUs to determine the block unit according to the partition indications based on any video coding standard.

The one of the CTUs may include a luma CTB and at least one chroma CTB. In some implementations, the at least one chroma CTB may be two chroma CTB s (i.e., a Cr CTB and a Cb CTB). The luma CTB may be divided into a plurality of luma coding units, and each of the at least one chroma CTB may be divided into a plurality of chroma coding units. A luma partitioning structure of the luma coding units in the luma CTB may be identical to or different from a chroma partitioning structure of the chroma coding units in each of the at least one chroma CTB. When a specific one of the chroma coding units in one of the at least one chroma CTB is reconstructed based on the luma coding units in the luma CTB, a block region in the one of the CTUs corresponding to the specific one of the chroma coding units may be regarded as the block unit. The block unit may include a luma block and a chroma block.

At block 530, the decoder module 124 determines a reference region neighboring the block unit from the current frame and determines a plurality of luma neighboring values in the reference region.

With reference to FIGS. 1, 2, and 4, when the chroma block of the block unit 400 is reconstructed based on the luma block of the block unit 400, the decoder module 124 may determine a plurality of linear models based on the reference region of the block unit 400 neighboring the block unit 400. The reference region 400 may include at least one of a plurality of neighboring regions 411-415. A first neighboring region may be a left neighboring region 411 located to a left side of the block unit 400, a second neighboring region may be an above neighboring region 412 located above the block unit 400, a third neighboring region may be an above-left neighboring region 413 located to a top-left side of the block unit 400, a fourth neighboring region may be a bottom-left neighboring region 414 located to a bottom-left side of the block unit 400, and a fifth neighboring region may be an above-right neighboring region 415 located to an above-right side of the block unit 400. The neighboring regions 411-415 may be reconstructed prior to the reconstruction of the block unit 400.

A height of the left neighboring region 411 may be equal to a height H (being a positive integer) of the block unit 400, and a width of the left neighboring region 411 may be equal to a number S (being a positive integer) of the luma reconstructed samples of the left neighboring region 411 along a horizontal direction. A height of the above neighboring region 412 may be equal to a number R (being a positive integer) of the luma reconstructed samples of the above neighboring region 412 along a vertical direction, and a width of the above neighboring region 412 may be equal to a width W (being a positive integer) of the block unit 400. In addition, a height of the above-left neighboring region 413 may be equal to the number R of the luma reconstructed samples of the above neighboring region 412 along the vertical direction, and a width of the above-left neighboring region 413 may be equal to the number S of the luma reconstructed samples of the left neighboring region 411 along the horizontal direction. A width of the bottom-left neighboring region 414 may be equal to the number S of the luma reconstructed samples of the left neighboring region 411 along the horizontal direction, and a height of the bottom-left neighboring region 414 may be equal to one of the width W and the height H of the block unit 400. A width of the above-right neighboring region 415 may be equal to one of the width W and the height H of the block unit 400, and a height of the above-right neighboring region 415 may be equal to the number R of the luma reconstructed samples of the above neighboring region 412 along the vertical direction. In some implementations, the numbers R and S may be positive integers (e.g., 1, 2, 3, etc.) that may be equal to, or different from, each other. In some implementations, the height of the bottom-left neighboring region 414 may be equal to or greater than the width W and the height H of the block unit 400. In some implementations, the width of the above-right neighboring region 415 may be equal to or greater than the width W and the height H of the block unit 400. In addition, the decoder module 124 may use at least one of the neighboring regions 411-415, as the reference region to determine the linear models for predicting the chroma block of the block unit 400.

Since the reference region is reconstructed prior to the reconstruction of the block unit 400, the decoder module 124 may directly receive a reconstructed result of the reference region. Thus, the decoder module 124 may directly determine a luma reference region including a plurality of luma neighboring samples of the reference region and a chroma reference region including a plurality of chroma neighboring samples of the reference region based on the reconstructed result of the reference region. In some implementations, the luma neighboring values may be the luma neighboring samples. In some implementations, the luma neighboring values may be a plurality of neighboring down-sampled values generated by applying the luma neighboring samples to a down-sampling filter.

At block 540, the decoder module 124 determines one or more first threshold values based on a plurality of gradient neighboring values generated by using the plurality of luma neighboring values.

With reference to FIGS. 1 and 2, the decoder module 124 may apply the luma neighboring values to a gradient filter to generate the gradient neighboring values. In some implementations, the decoder module 124 may apply the luma neighboring samples of the luma reference region to the gradient filter to generate the gradient neighboring values. In some implementations, the decoder module 124 may apply the neighboring down-sampled values determined from the luma neighboring samples to the gradient filter to generate the gradient neighboring values. In some implementations, the gradient filter may be one of a plurality of plurality of gradient filter candidates determined, as follows:

$$\begin{bmatrix} 1 & 0 & -1 \\ 1 & 0 & -1 \end{bmatrix}, \begin{bmatrix} 1 & 2 & 1 \\ -1 & 2 & -1 \end{bmatrix}, \begin{bmatrix} 2 & 1 & -1 \\ 1 & -1 & -2 \end{bmatrix}, \begin{bmatrix} -1 & 1 & 2 \\ -2 & -1 & 1 \end{bmatrix},$$

$$\begin{bmatrix} 0 & 2 & -2 \\ 0 & 1 & -1 \end{bmatrix}, \begin{bmatrix} 1 & 1 & 1 \\ -1 & -1 & -1 \end{bmatrix}, \begin{bmatrix} 1 & 1 & -1 \\ 1 & -1 & -1 \end{bmatrix}, \begin{bmatrix} -1 & 1 & 1 \\ -1 & -1 & 1 \end{bmatrix},$$

$$\begin{bmatrix} 0 & 1 & -1 \\ 0 & 1 & -1 \end{bmatrix}, \begin{bmatrix} 0 & 1 & 1 \\ 0 & -1 & -1 \end{bmatrix}, \begin{bmatrix} 1 & 1 & 0 \\ 0 & -1 & -1 \end{bmatrix}, \begin{bmatrix} 0 & 1 & 1 \\ -1 & -1 & 0 \end{bmatrix},$$

-continued $$\begin{bmatrix} 1 & -1 & 0 \\ 1 & -1 & 0 \end{bmatrix}, \begin{bmatrix} 1 & 1 & 0 \\ -1 & -1 & 0 \end{bmatrix}, \begin{bmatrix} 1 & 2 & 0 \\ 0 & -2 & -1 \end{bmatrix}, \begin{bmatrix} 0 & 2 & 1 \\ -1 & -2 & 0 \end{bmatrix},$$

$$\begin{bmatrix} 1 & 0 & -1 \\ 2 & 0 & -2 \\ 1 & 0 & -1 \end{bmatrix}, \begin{bmatrix} 1 & 2 & 1 \\ 0 & 0 & 0 \\ -1 & -2 & -1 \end{bmatrix}$$

In some implementations, the gradient filter may be one of a vertical gradient filter and a horizontal gradient filter.

The decoder module 124 may calculate one or more first threshold values based on the gradient neighboring values. The one or more first threshold values may be used to separate/divide the gradient neighboring values into a plurality of first model groups. The number of the one or more first threshold values may be equal to a value generated by subtracting one from the number of the first model groups. For example, the number of the one or more first threshold values may be equal to one, and the number of the first model groups may be equal to two. Thus, when a specific one of the gradient neighboring values is greater than the first threshold value, the specific gradient neighboring value may be added to a high frequency model group. To the contrary, when the specific gradient neighboring value is less than or equal to the first threshold value, the specific gradient neighboring value may be added to a low frequency model group. Thus, the one or more first threshold values may separate/divide the gradient neighboring values having different gradient frequencies into different first model groups.

The one or more first threshold values may be at least one of an average, a median, a quartile, or other values determined based on the gradient neighboring values. In some implementations, when the number of the plurality of first model groups is equal to two, the one or more first threshold values may be an average of the gradient neighboring values.

The decoder module 124 may categorize the gradient neighboring values into the first model groups based on the one or more first threshold values. In addition, the decoder module 124 may also categorize the luma neighboring values into the first model groups based on the one or more first threshold values. In some implementations, the decoder module 124 may categorize the luma neighboring values into the first model groups based on a distribution of the gradient neighboring values in the first model groups. The distribution of the gradient neighboring values in the first model groups may be determined based on a plurality of comparisons between the gradient neighboring values and the one or more first threshold values. For example, when a specific one of the gradient neighboring values determined based on a specific one of the luma neighboring values is added to a specific one of the first model groups, the specific luma neighboring value corresponding to the gradient neighboring value may also be added to the specific first model group. In addition, the decoder module 124 may categorize the chroma neighboring samples into the first model groups based on a plurality of region positions of the luma neighboring values in the first model groups. For example, when the specific luma neighboring value located at a specific one of the region positions is added to the specific first model group, a specific one of the chroma neighboring samples located at the specific region position may also be added to the specific first model group.

In some implementations, the decoder module 124 may use the luma neighboring values and the chroma neighboring samples in the first model groups to determine a plurality of first prediction model equations. In some implementations, each of the first prediction model equations may be a luma linear model equation of the reference region indicated, as follows:

$$nP_C(i,j)=\alpha_L \times nL(i,j)+\beta_L$$

In the above equation, $\alpha_L$ and $\beta_L$ may be a first and a second linear model parameters of the first model groups in the reference region, $nP_C(i,j)$ may be a chroma predicted block of the chroma reference region predicted by using a plurality of luma neighboring values based on the luma linear model equation, and $nL(i,j)$ may include the luma neighboring values. In some implementations, the luma neighboring values may be the luma neighboring samples. In some implementations, the luma neighboring values may be the neighboring down-sampled values. In some implementations, the linear model parameters, $\alpha_L$ and $\beta_L$, for each of the first model groups may be calculated by the luma neighboring values and the chroma neighboring samples in each of the first model groups.

For example, when the number of the first model groups is equal to two, the linear model parameters, $\alpha_{L-H}$ and $\beta_{L-H}$, of the high frequency model group may be determined based on the luma neighboring values and the chroma neighboring samples in the high frequency model group and the linear model parameters, $\alpha_{L-L}$ and $\beta_{L-L}$, of the low frequency model group may be determined based on the luma neighboring values and the chroma neighboring samples in the low frequency model group.

In some implementations, the decoder module 124 may use the gradient neighboring values and the chroma neighboring samples in the first model groups to determine a plurality of second prediction model equations. In some implementations, each of the second prediction model equations may be a gradient linear model equation of the reference region indicated, as follows:

$$nP_C(i,j)=\alpha_G \times nG(i,j)+\beta_G$$

where $\alpha_G$ and $\beta_G$ may be a third and a fourth linear model parameters of the first model groups in the reference region, $nP_C(i,j)$ may be a chroma predicted block of the chroma reference region predicted by using a plurality of gradient neighboring values based on the gradient linear model equation, and $nG(i,j)$ may include the gradient neighboring values. In some implementations, the linear model parameters, a $\alpha_G$ and $\beta_G$, for each of the first model groups may be calculated by the gradient neighboring values and the chroma neighboring samples in each of the first model groups.

For example, when the number of the first model groups is equal to two, the linear model parameters, $\alpha_{G-H}$ and $\beta_{G-H}$, of the high frequency model group may be determined based on the gradient neighboring values and the chroma neighboring samples in the high frequency model group and the linear model parameters, $\alpha_{G-L}$ and $\beta_{G-L}$, of the low frequency model group may be determined based on the gradient neighboring values and the chroma neighboring samples in the low frequency model group.

In some implementations, the decoder module 124 may further calculate one or more second threshold values based on the luma neighboring values for each of the first model groups. The one or more second threshold values for each of the first model groups may be used to further separate/divide the luma neighboring values in a corresponding one of the first model groups into a plurality of second model groups. The number of the one or more second threshold values for a specific one of the first model groups may be equal to a value generated by subtracting one from the number of the second model groups for the specific first model group. For example, the number of the one or more second threshold values for each of the first model groups may be equal to one, and the number of the second model groups for each of the first model groups may be equal to two and the total number of the second model groups may be equal to four. Thus, when a specific one of the luma neighboring values in the high frequency model group is greater than the second threshold value, the specific luma neighboring value may be added to a high frequency large model group. To the contrary, when the specific luma neighboring value is less than or equal to the second threshold value, the specific luma neighboring value in the high frequency model group may be added to a high frequency small model group. In addition, the low frequency model group may also separate/divide into a low frequency large model group and a low frequency small model group. Thus, the one or more second threshold values may further separate/divide the luma neighboring values in the first model groups into different second model groups.

The one or more second threshold values may be at least one of an average, a median, a quartile, or other values determined based on the luma neighboring values. In some implementations, when the number of the plurality of second model groups for each of the first model groups is equal to two, the one or more second threshold values for each of the first model groups may be an average of the luma neighboring values in a corresponding one of the first model groups.

The decoder module 124 may categorize the chroma neighboring samples into the second model groups based on a plurality of region positions of the luma neighboring values in the second model groups. For example, when a specific one of the luma neighboring values located at a specific one of the region position is added to a specific one of the second model groups, a specific one of the chroma neighboring samples located at the specific region position may also be added to the specific second model group.

In some implementations, the decoder module 124 may use the luma neighboring values and the chroma neighboring samples in each of the second model groups to determine a plurality of third prediction model equations. In some implementations, each of the third prediction model equations may also be a luma linear model equation including a fifth and a sixth linear model parameters for a corresponding one of the second model groups in the reference region. For example, the linear model parameters, $\alpha_{L-HL}$ and $\beta_{L-HL}$, of the high frequency large model group may be determined based on the luma neighboring values and the chroma neighboring samples in the high frequency large model group and the linear model parameters, $\alpha_{L-HS}$ and $\beta_{L-HS}$, of the high frequency small model group may be determined based on the luma neighboring values and the chroma neighboring samples in the high frequency small model group. In addition, the linear model parameters, $\alpha_{L-LL}$ and $\beta_{L-LL}$, of the low frequency large model group may be determined based on the luma neighboring values and the chroma neighboring samples in the low frequency large model group and the linear model parameters, $\alpha_{L-LS}$ and $\beta_{L-LS}$, of the low frequency small model group may be determined based on the luma neighboring values and the chroma neighboring samples in the low frequency small model group.

Figure 6A:
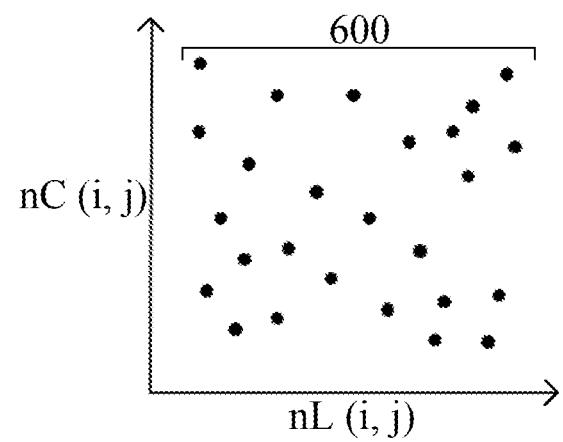
FIG. 6A illustrates an example implementation of a scatter diagram showing a plurality of correlations between the luma neighboring values and the chroma neighboring samples in the reference region, in accordance with one or more techniques of this disclosure.

FIG. 6A illustrates an example implementation of a scatter diagram showing a plurality of correlations between the luma neighboring values and the chroma neighboring samples in the reference region, in accordance with one or more techniques of this disclosure. Each of data points in FIG. 6A may show color information of a data position that is located in the reference region and that includes one of the luma neighboring values and one of the chroma neighboring samples. In FIG. 6A, a first data distribution 600 of the data points may be disordered and irregular. Thus, if the luma neighboring values and the chroma neighboring samples are directly used to determine one prediction model filter, the prediction model filter of the first data distribution 600 may lack representativeness and may not be accurate.

Figure 6B:
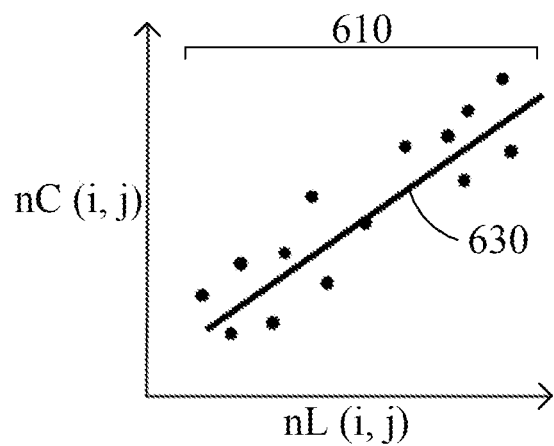
FIGS. 6B-6C illustrate an example implementation of two scatter diagrams respectively showing a low frequency model group and a high frequency model group, in accordance with one or more example implementations of this disclosure.
Figure 6C:
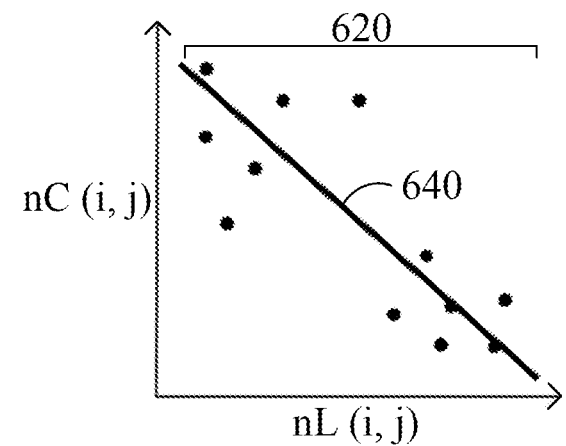

FIGS. 6B-6C illustrate an example implementation of two scatter diagrams respectively showing a low frequency model group and a high frequency model group, in accordance with one or more example implementations of this disclosure. The data points in FIG. 6A may be categorized based on a plurality of comparisons between the gradient neighboring values and the first threshold value. In FIG. 6B, the chroma neighboring samples of the data points included in the low frequency mode group may be increased when the luma reconstructed values of the data points included in the low frequency mode group are increased. In the contrary, in FIG. 6C, the chroma neighboring samples of the data points included in the high frequency mode group may be decreased when the luma reconstructed values of the data points included in the high frequency mode group are increased. Thus, after the data points in FIG. 6A are separated/divided into the first model groups based on the first threshold values, a second data distribution 610 of the data points in the low frequency mode group and a third data distribution 620 of the data points in the high frequency mode group may become ordered and regular. When the luma neighboring values and the chroma neighboring samples in different first model groups are respectively used to determine difference prediction model filters, a combination of a prediction model filter 630 of the second data distribution 610 and a prediction model filter 640 of the third data distribution 620 may be more representative and more accurate than using only one prediction model filter of the first data distribution 600.

Figure 6D:
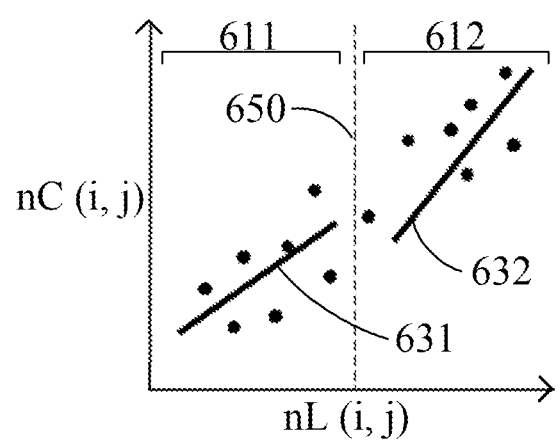
FIGS. 6D-6E illustrate an example implementation of two scatter diagrams respectively showing two model subgroups in each of the low frequency model group illustrated in FIG. 6B and the high frequency model group illustrated in FIG. 6C, in accordance with one or more example implementations of this disclosure.
Figure 6E:
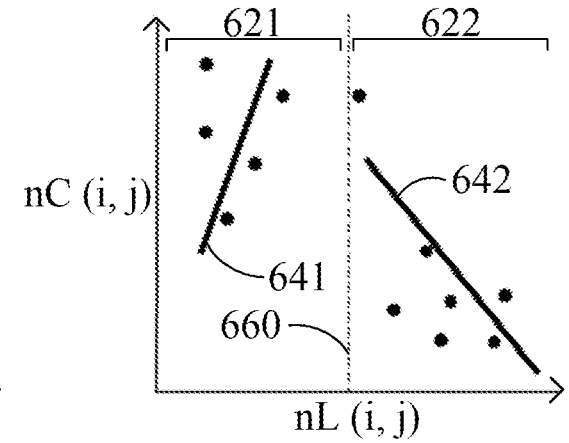

FIGS. 6D-6E illustrate an example implementation of two scatter diagrams respectively showing two model subgroups in each of the low frequency model group illustrated in FIG. 6B and the high frequency model group illustrated in FIG. 6C, in accordance with one or more example implementations of this disclosure. The data points of the low frequency model group in FIG. 6B may be further categorized based on a plurality of comparisons between the luma reconstructed values and the second threshold value 650, and the data points of the high frequency model group in FIG. 6C may be further categorized based on a plurality of comparisons between the luma reconstructed values and the second threshold value 660 of the high frequency model group. In FIG. 6D, a prediction model filter 631 of a fourth data distribution 611 may have a similar orientation with a prediction model filter 632 of a fifth data distribution 612. In addition, in FIG. 6E, a prediction model filter 641 of a sixth data distribution 621 may have an orientation that is nearly opposite a prediction model filter 642 of a seventh data distribution 622. When the luma neighboring values and the chroma neighboring samples in different second model groups are respectively used to determine prediction model filters, a combination of the prediction model filters 631, 632, 641, and 642 may be more representative and more accurate than using only one prediction model filter of the first data distribution 600 and using the combination of the prediction model filters 630 and 640.

Referring back to FIG. 5, at block 550, the decoder module 124 determines a plurality of luma reconstructed values in a luma block of the block unit and divides the plurality of luma reconstructed values into a plurality of model groups based on the one or more first threshold values.

The luma block of the block unit may be reconstructed prior to the reconstruction of the chroma block of the block unit. Thus, with reference to FIGS. 1 and 2, the decoder module 124 may directly receive a reconstructed result of the luma block reconstructed based on the video data when the decoder module 124 is reconstructing the chroma block. The decoder module 124 may directly determine the luma reconstructed samples in the luma block based on the reconstructed result that is determined for the luma block. The luma reconstructed samples may be applied to the down-sampling filter to generate a plurality of luma down-sampled values. In some implementations, the luma reconstructed samples may be applied to the gradient filter to generate a plurality of luma gradient values. In some implementations, the luma down-sampled values may be applied to the gradient filter to generate the luma gradient values. In some implementations, the luma reconstructed values may be the luma reconstructed samples. In some implementations, the luma reconstructed values may be the luma down-sampled values. In some implementations, the luma reconstructed values may be the luma gradient values.

The decoder module 124 may categorize the luma gradient values into the first model groups based on the one or more first threshold values calculated based on the gradient neighboring values. In addition, the decoder module 124 may further categorize the luma reconstructed values into the first model groups based on the one or more first threshold values. In some implementations, the decoder module 124 may categorize the luma reconstructed samples or the luma down-sampled values into the first model groups based on a distribution of the luma gradient values in the first model groups. The distribution of the luma gradient values in the first model groups may be determined based on a plurality of comparisons between the luma gradient values and the one or more first threshold values. For example, when a specific one of the luma gradient values determined based on a specific one of the luma down-sampled values is added to a specific one of the first model groups, the specific luma down-sampled value corresponding to the specific luma gradient value may also be added to the specific first model group. In addition, when a specific one of the luma gradient values determined based on a specific one of the luma reconstructed values is added to the specific first model group, the specific luma reconstructed value corresponding to the specific luma gradient value may also be added to the specific first model group.

The decoder module 124 may categorize the luma reconstructed values in each of the first model groups into the second model groups based on the one or more second threshold values calculated based on the luma reconstructed values in each of the first model groups. In some implementations, the decoder module 124 may categorize the luma reconstructed samples in each of the first model groups into the second model groups based on the one or more second threshold values. In some implementations, the decoder module 124 may categorize the luma down-sampled values in each of the first model groups into the second model groups based on the one or more second threshold values.

Returning to FIG. 5, at block 560, the decoder module 124 reconstructs a chroma block of the block unit by applying the plurality of model groups to a plurality of prediction model equations.

In some implementations, with reference to FIGS. 1 and 2, the decoder module 124 may use the luma reconstructed values in each of the first model groups to calculate a plurality of chroma predicted samples based on a plurality of fourth prediction model equations. In some implementations, each of the fourth prediction model equations may be a luma linear model equation of the block unit corresponding to the luma linear model equation of the reference region and may be determined, as follows:

$$P_C(i,j) = \alpha_L \times L(i,j) + \beta_L$$

In the above equation, $\alpha_L$ and $\beta_L$ may be the first and the second linear model parameters of the first model groups in the reference region, $P_C(i,j)$ may be a chroma predicted block of the chroma block predicted by using the luma reconstructed values based on the luma linear model equation, and $L(i,j)$ may include the luma reconstructed values. In some implementations, the luma reconstructed values may be identical to the luma reconstructed samples. In some implementations, the luma reconstructed values may be identical to the luma down-sampled values.

For example, when the number of the first model groups is equal to two, a portion of the chroma predicted samples of the chroma block may be generated by applying the luma reconstructed values in the high frequency model group to the luma linear model equation having the linear model parameters, $\alpha_{L\text{-}H}$ and $\beta_{L\text{-}H}$, and the other chroma predicted samples of the chroma block may be generated by applying the luma reconstructed values in the low frequency model group to the luma linear model equation having the linear model parameters, $\alpha_{L\text{-}L}$ and $\beta_{L\text{-}L}$.

In some implementations, the decoder module 124 may use the luma gradient values in each of the first model groups to calculate the chroma predicted samples based on a plurality of fifth prediction model equations. In some implementations, each of the fifth prediction model equations may be a gradient linear model equation of the block unit corresponding to the gradient linear model equation of the reference region and may be determined, as follows:

$$P_C(i,j) = \alpha_G \times G(i,j) + \beta_G$$

In the above equation, $\alpha_G$ and $\beta_G$ may be the third and the fourth linear model parameters of the first model groups in the reference region, $P_C(i,j)$ may be the chroma predicted block of the chroma block predicted by using the luma gradient values based on the gradient linear model equation, and $G(i,j)$ may include the luma gradient values.

For example, when the number of the first model groups is equal to two, a portion of the chroma predicted samples of the chroma block may be generated by applying the luma gradient values in the high frequency model group to the gradient linear model equation having the linear model parameters, $\alpha_{G\text{-}H}$ and $\beta_{G\text{-}H}$, and the other chroma predicted samples of the chroma block may be generated by applying the luma gradient values in the low frequency model group to the gradient linear model equation having the linear model parameters, $\alpha_{G\text{-}L}$ and $\beta_{G\text{-}L}$.

In some implementations, the decoder module 124 may use the luma reconstructed values in each of the second model groups to calculate the chroma predicted samples based on a plurality of sixth prediction model equations. In some implementations, each of the sixth prediction model equations may be a luma linear model equation of the block unit corresponding to the luma linear model equation of the reference region including the fifth and a sixth linear model parameters.

In some implementations, the luma reconstructed values may be separated/divided into two first model groups, and each of the two first model groups may be further separated/divided into two second model groups. Thus, a first portion of the chroma predicted samples of the chroma block may be generated by applying the luma reconstructed values in the high frequency large model group to the luma linear model equation having the linear model parameters, $\alpha_{L\text{-}HL}$ and $\beta_{L\text{-}HL}$. In addition, a second portion of the chroma predicted samples of the chroma block may be generated by applying the luma reconstructed values in the high frequency small model group to the luma linear model equation having the linear model parameters, $\alpha_{L\text{-}HS}$ and $\beta_{L\text{-}HS}$. A third portion of the chroma predicted samples of the chroma block may be generated by applying the luma reconstructed values in the low frequency large model group to the luma linear model equation having the linear model parameters, $\alpha_{L\text{-}LL}$ and $\beta_{L\text{-}LL}$. A last portion of the chroma predicted samples of the chroma block may be generated by applying the luma reconstructed values in the low frequency small model group to the luma linear model equation having the linear model parameters, $\alpha_{L\text{-}LS}$ and $\beta_{L\text{-}LS}$.

The decoder module 124 may generate the chroma predicted block based on the prediction model equations of the prediction model mode for the chroma block. Then, the decoder module 124 may further add a plurality of residual components into the chroma predicted block to reconstruct the chroma block. The residual components may be a plurality of chroma residual components determined based on the bitstream. The decoder module 124 may reconstruct all of the other chroma blocks in the current frame for reconstructing the current frame and the video data. The method/process 500 may then end.

Figure 7:
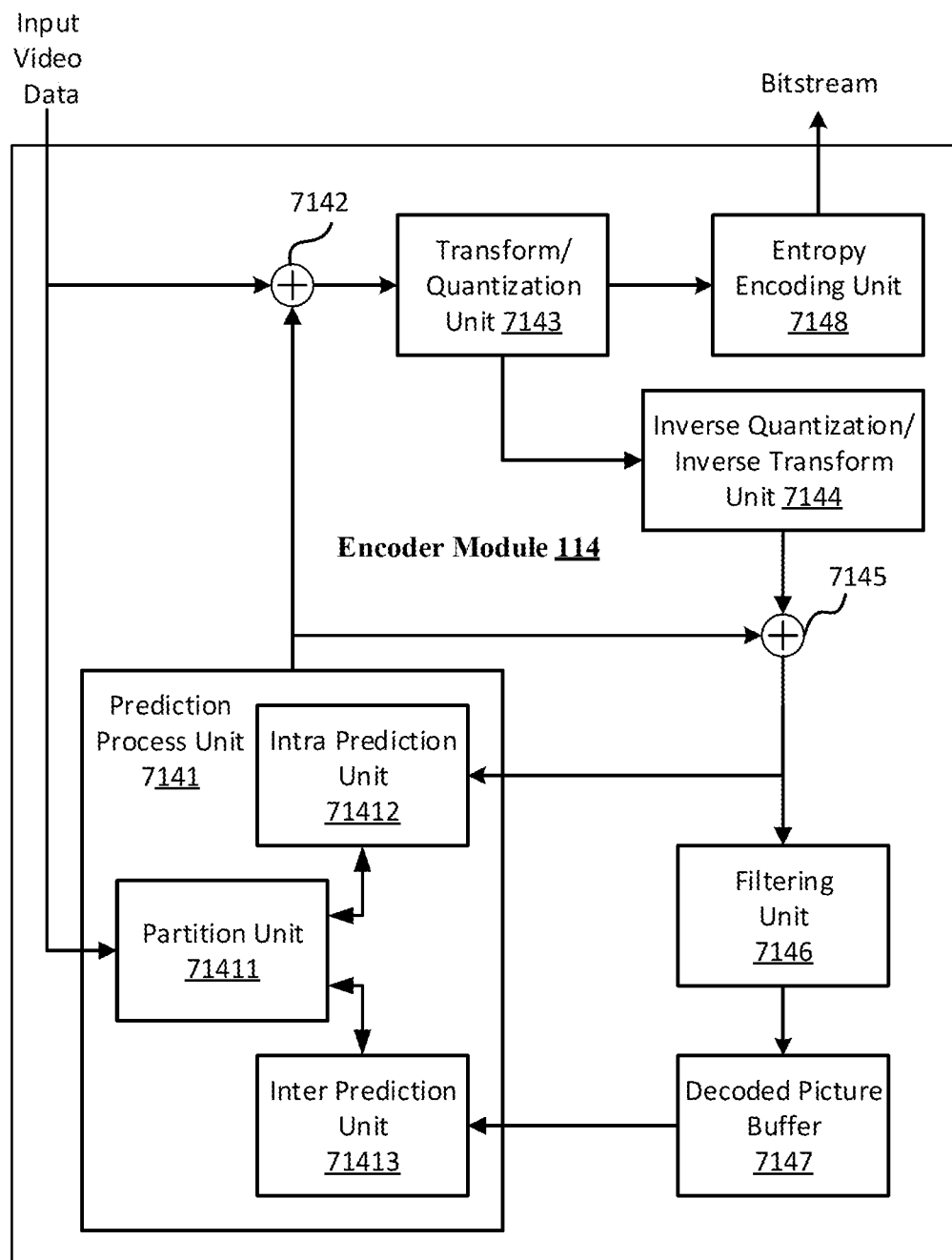
FIG. 7 is a block diagram illustrating an encoder module of the first electronic device illustrated in FIG. 1, in accordance with one or more example implementations of this disclosure.

FIG. 7 is a block diagram illustrating an encoder module 114 of the first electronic device 110 illustrated in FIG. 1, in accordance with one or more example implementations of this disclosure. The encoder module 114 may include a prediction processor (e.g., a prediction process unit 7141), at least a first summer (e.g., a first summer 7142) and a second summer (e.g., a second summer 7145), a transform/quantization processor (e.g., a transform/quantization unit 7143), an inverse quantization/inverse transform processor (e.g., an inverse quantization/inverse transform unit 7144), a filter (e.g., a filtering unit 7146), a decoded picture buffer (e.g., a decoded picture buffer 7147), and an entropy encoder (e.g., an entropy encoding unit 7148). The prediction process unit 7141 of the encoder module 114 may further include a partition processor (e.g., a partition unit 71411), an intra prediction processor (e.g., an intra prediction unit 71412), and an inter prediction processor (e.g., an inter prediction unit 71413).

The encoder module 114 may receive the source video and encode the source video to output a bitstream. The encoder module 114 may receive source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, CTUs, CBs, sub-divisions thereof, and/or other equivalent coding units.

The encoder module 114 may perform additional subdivisions of the source video. It should be noted that the disclosed implementations are generally applicable to video coding regardless of how the source video is partitioned prior to and/or during the encoding.

During the encoding process, the prediction process unit 7141 may receive a current image block of a specific one of the image frames. The current image block may be the luminance block or one of the chrominance blocks in the specific image frame.

The partition unit 71411 may divide the current image block into multiple block units. The intra prediction unit 71412 may perform intra-predictive coding of a current block unit relative to one or more neighboring blocks in the same frame as the current block unit in order to provide spatial prediction. The inter prediction unit 71413 may perform inter-predictive coding of the current block unit relative to one or more blocks in one or more reference image blocks to provide temporal prediction.

The prediction process unit 7141 may select one of the coding results generated by the intra prediction unit 71412 and the inter prediction unit 71413 based on a mode selection method, such as a cost function. The mode selection method may be a rate-distortion optimization (RDO) process.

The prediction process unit 7141 may determine the selected coding result and provide a predicted block corresponding to the selected coding result to the first summer 7142 for generating a residual block and to the second summer 7145 for reconstructing the encoded block unit. The prediction process unit 7141 may further provide syntax elements, such as motion vectors, intra mode indicators, partition information, and/or other syntax information, to the entropy encoding unit 7148.

The intra prediction unit 71412 may intra predict the current block unit. The intra prediction unit 71412 may determine an intra prediction mode directed toward a reconstructed sample neighboring the current block unit in order to encode the current block unit.

The intra prediction unit 71412 may encode the current block unit using various intra prediction modes. The intra prediction unit 71412 of the prediction process unit 7141 may select an appropriate intra prediction mode from the selected modes. The intra prediction unit 71412 may encode the current block unit using a cross component prediction mode to predict one of the two chroma components of the current block unit based on the luma components of the current block unit. The intra prediction unit 71412 may predict a first one of the two chroma components of the current block unit based on the second of the two chroma components of the current block unit.

The inter prediction unit 71413 may inter predict the current block unit as an alternative to the intra prediction performed by the intra prediction unit 71412. The inter prediction unit 71413 may perform motion estimation to estimate motion of the current block unit for generating a motion vector.

The motion vector may indicate a displacement of the current block unit within the current image block relative to a reference block unit within a reference image block. The inter prediction unit 71413 may receive at least one reference image block stored in the decoded picture buffer 7147 and estimate the motion based on the received reference image blocks to generate the motion vector.

The first summer 7142 may generate the residual block by subtracting the prediction block determined by the prediction process unit 7141 from the original current block unit. The first summer 7142 may represent the component or components that perform this subtraction.

The transform/quantization unit 7143 may apply a transform to the residual block in order to generate a residual transform coefficient and then quantize the residual transform coefficients to further reduce bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 7143 may perform a scan of the matrix including the quantized transform coefficients. Alternatively, the entropy encoding unit 7148 may perform the scan.

The entropy encoding unit 7148 may receive a plurality of syntax elements from the prediction process unit 7141 and the transform/quantization unit 7143, including a quantization parameter, transform data, motion vectors, intra modes, partition information, and/or other syntax information. The entropy encoding unit 7148 may encode the syntax elements into the bitstream.

The entropy encoding unit 7148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 7144 may apply inverse quantization and inverse transformation to reconstruct the residual block in the pixel domain for later use as a reference block. The second summer 7145 may add the reconstructed residual block to the prediction block provided from the prediction process unit 7141 in order to produce a reconstructed block for storage in the decoded picture buffer 7147.

The filtering unit 7146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 7145.

The decoded picture buffer 7147 may be a reference picture memory that stores the reference block for use by the encoder module 714 to encode video, such as in intra or inter coding modes. The decoded picture buffer 7147 may include a variety of memory devices, such as DRAM (e.g., including SDRAM), MRAM, RRAM, or other types of memory devices. The decoded picture buffer 7147 may be on-chip with other components of the encoder module 114 or off-chip relative to those components.

The method/process 300 for decoding and/or encoding video data may be performed by the first electronic device 110. With reference to FIGS. 1, 3, and 7, at block 310, the method/process 300 may start by the encoder module 114 receiving the video data. The video data received by the encoder module 114 may be a video. At block 320, the encoder module 114 may determine a block unit from a current frame included in the video data. The encoder module 114 may divide the current frame to generate a plurality of CTUs, and further divide one of the CTUs to determine the block unit according to the partition indications based on any video coding standard.

With reference to FIGS. 1, 3, and 7, at block 330, the encoder module 114 may determine a plurality of luma reconstructed samples in a luma block of the block unit based on the video data. In addition, at block 340, the encoder module 114 may determine a prediction model filter of a prediction model mode for a chroma block of the block unit based on the video data. The encoder module 114 may determine the prediction model filter of the prediction model mode based on a reference region of the block unit neighboring the block unit. The encoder module 114 may directly determine a luma reference region including a plurality of luma neighboring samples of the reference region and a chroma reference region including a plurality of chroma neighboring samples of the reference region based on a reconstructed result of the reference region and determine a first filter parameter, a second filter parameter, and any other filter parameters of the prediction model filter based on the luma neighboring samples and the chroma neighboring samples. The filter parameters of the prediction model mode for the chroma reference region may be derived based on at least two of the chroma neighboring samples, the luma neighboring samples, a plurality of neighboring down-sampled values, a plurality of square neighboring values, a plurality of gradient neighboring values, and a plurality of square gradient neighboring values. The neighboring down-sampled values may be generated by applying the luma neighboring samples to a down-sampling filter. The square neighboring values may be generated by squaring each of the luma neighboring values. The gradient neighboring values may be generated by applying the luma neighboring values to a gradient filter. The square gradient neighboring values may be generated by squaring each of the gradient neighboring values. The encoder module 114 and the decoder module 124 may use the same process to determine the prediction model filter of the prediction model mode for the chroma block of the block unit based on the video data.

In some implementations, the gradient filter may be one of a plurality of plurality of gradient filter candidates indicated, as follows:

$$\begin{bmatrix} 1 & 0 & -1 \\ 1 & 0 & -1 \end{bmatrix}, \begin{bmatrix} 1 & 2 & 1 \\ -1 & 2 & -1 \end{bmatrix}, \begin{bmatrix} 2 & 1 & -1 \\ 1 & -1 & -2 \end{bmatrix}, \begin{bmatrix} -1 & 1 & 2 \\ -2 & -1 & 1 \end{bmatrix},$$

$$\begin{bmatrix} 0 & 2 & -2 \\ 0 & 1 & -1 \end{bmatrix}, \begin{bmatrix} 1 & 1 & 1 \\ -1 & -1 & -1 \end{bmatrix}, \begin{bmatrix} 1 & 1 & -1 \\ 1 & -1 & -1 \end{bmatrix}, \begin{bmatrix} -1 & 1 & 1 \\ -1 & -1 & 1 \end{bmatrix},$$

$$\begin{bmatrix} 0 & 1 & -1 \\ 0 & 1 & -1 \end{bmatrix}, \begin{bmatrix} 0 & 1 & 1 \\ 0 & -1 & -1 \end{bmatrix}, \begin{bmatrix} 1 & 1 & 0 \\ 0 & -1 & -1 \end{bmatrix}, \begin{bmatrix} 0 & 1 & 1 \\ -1 & -1 & 0 \end{bmatrix},$$

$$\begin{bmatrix} 1 & -1 & 0 \\ 1 & -1 & 0 \end{bmatrix}, \begin{bmatrix} 1 & 1 & 0 \\ -1 & -1 & 0 \end{bmatrix}, \begin{bmatrix} 1 & 2 & 0 \\ 0 & -2 & -1 \end{bmatrix}, \begin{bmatrix} 0 & 2 & 1 \\ -1 & -2 & 0 \end{bmatrix},$$

$$\begin{bmatrix} 1 & 0 & -1 \\ 2 & 0 & -2 \\ 1 & 0 & -1 \end{bmatrix}, \begin{bmatrix} 1 & 2 & 1 \\ 0 & 0 & 0 \\ -1 & -2 & -1 \end{bmatrix}$$

In some implementations, the gradient filter may be one of a vertical gradient filter and a horizontal gradient filter. For example, the vertical gradient filter may be the gradient filter candidate $$\begin{bmatrix} 1 & 0 & -1 \\ 2 & 0 & -2 \\ 1 & 0 & -1 \end{bmatrix},$$

and the horizontal gradient filter may be the gradient filter candidate $$\begin{bmatrix} 1 & 2 & 1 \\ 0 & 0 & 0 \\ -1 & -2 & -1 \end{bmatrix}.$$

With reference to FIGS. 1, 3, and 7, at block 350, the encoder module 114 may determine a plurality of luma square values and a plurality of luma gradient values based on the plurality of luma reconstructed samples. In some implementations, the luma square values may be generated by squaring each of the luma reconstructed samples. In some implementations, the luma square values may be generated by squaring each of a plurality of luma down-sampled values, and the luma down-sampled values may be generated by applying the luma reconstructed samples to the down-sample filter. In some implementations, the luma gradient values may be generated by applying the luma reconstructed samples to the gradient filter. In some implementations, the luma gradient values may be generated by applying the luma down-sampled values to the gradient filter. In some implementations, the luma square values may be generated by squaring each of the luma gradient values. In some implementations, the luma gradient values may be generated by applying the luma reconstructed samples to the gradient filter to generate a plurality of luma intermediate values and then squaring each of the luma intermediate values. In some implementations, the luma gradient values may be generated by applying the luma down-sampled values to the gradient filter to generate the luma intermediate values and then squaring each of the luma intermediate values. The encoder module 114 and the decoder module 124 may use the same process to generate the luma square values and the luma gradient values based on the luma reconstructed samples.

With reference to FIGS. 1, 3, and 7, at block 360, the encoder module 114 may reconstructs the chroma block of the block unit by applying the plurality of luma square values and the plurality of luma gradient values to the prediction model filter. The prediction model filter of the reference region may correspond to the prediction model filter of the block unit. Thus, the filter parameters of the reference region may be identical to those of the block unit. The encoder module 114 may generate a chroma predicted block based on the prediction model filter of the prediction model mode for the block unit. The encoder module 114 and the decoder module 124 may use the same process to generate the chroma predicted block based on the prediction model filter.

In some implementations, the encoder module 114 may simultaneously predict the chroma block based on other chroma prediction modes to generate other predicted blocks. The encoder module 114 may traverse the chroma predicted blocks of the block unit and select one of the chroma predicted blocks based on a mode selection method, such as a cost function. The cost function may include an RDO, an SAD, an SATD, a Mean Absolute Difference (MAD), a Mean Squared Difference (MSD), and a Structural SIMilarity (SSIM). It should be noted that any cost function may be used without departing from this disclosure. When the prediction model mode having the prediction model filter is selected, the encoder module 114 may determine a plurality of residual components by comparing a plurality of color components in the block unit with the chroma predicted blocks of the block unit generated based on the prediction model filter. The encoder module 114 may further reconstruct the block unit based on the residual components and the chroma predicted blocks to generate a plurality of reference samples for a plurality of following blocks that are predicted after predicting the block unit. In addition, the residual components may be encoded into the bitstream by the encoder module 114 for providing to the decoder module 124.

Furthermore, in some implementations, the prediction model mode of the chroma block may include a plurality of non-linear model filters. Thus, the previously mentioned prediction model filter of the prediction model mode may just be one of the non-linear model filters. The number of the non-linear model filters may be a positive integer equal to two, three, and more than three. Each of the non-linear model filters may include a first filter parameter, $\alpha$, a second filter parameter, $\beta$, and a third filter parameter, $\gamma$. In some implementations, the encoder module 114 may calculate one or more threshold values based on the luma neighboring values. The one or more threshold values may be used to separate/divide the luma neighboring values into a plurality of model groups. The encoder module 114 may categorize the luma neighboring values and the chroma neighboring samples into the model groups based on the one or more threshold values. The encoder module 114 may determine different non-linear model filters based on the luma neighboring values and the chroma neighboring samples in different model groups. The encoder module 114 may compare each of the luma reconstructed values with the one or more threshold values for checking a distribution of the luma reconstructed values in the model groups, and further determine the luma square values and the luma gradient values for each of the model groups based on the luma reconstructed values. Thus, the encoder module 114 may apply the luma square values and the luma gradient values to the non-linear model filters based on the distribution of the luma reconstructed values for reconstructing the chroma block. The encoder module 114 and the decoder module 124 may use the same process to generate different non-linear model filters for each of the model groups to predict the chroma block of the block unit. The method/process 300 may then end.

The method/process 500 for decoding and/or encoding video data may be performed by the first electronic device 110. With reference to FIGS. 1, 5, and 7, at block 510, the method/process 500 may start by the encoder module 114 receiving the video data. The video data received by the encoder module 114 may be a video. At block 520, the encoder module 114 may determine a block unit from a current frame included in the video data. The encoder module 114 may divide the current frame to generate a plurality of CTUs, and further divide one of the CTUs to determine the block unit according to the partition indications based on any video coding standard.

With reference to FIGS. 1, 5, and 7, at block 530, the encoder module 114 may determine a reference region neighboring the block unit from the current frame and determine a plurality of luma neighboring values in the reference region. Since the reference region is reconstructed prior to the reconstruction of the block unit 400, the encoder module 114 may directly receive a reconstructed result of the reference region. Thus, the encoder module 114 may directly determine a luma reference region including a plurality of luma neighboring samples of the reference region and a chroma reference region including a plurality of chroma neighboring samples of the reference region based on the reconstructed result of the reference region. In some implementations, the luma neighboring values may be the luma neighboring samples. In some implementations, the luma neighboring values may be a plurality of neighboring down-sampled values generated by applying the luma neighboring samples to a down-sampling filter. The encoder module 114 and the decoder module 124 may use the same process to determine the reference region neighboring the block unit from the current frame and to determine the luma neighboring values in the reference region.

With reference to FIGS. 1, 5, and 7, at block 540, the encoder module 114 may determine one or more first threshold values based on a plurality of gradient neighboring values generated by using the plurality of luma neighboring values. In some implementations, the encoder module 114 may apply the luma neighboring samples of the luma reference region to the gradient filter to generate the gradient neighboring values. In some implementations, the encoder module 114 may apply the neighboring down-sampled values determined from the luma neighboring samples to the gradient filter to generate the gradient neighboring values. The encoder module 114 may calculate one or more first threshold values based on the gradient neighboring values. The one or more first threshold values may be used to separate/divide the gradient neighboring values into a plurality of first model groups. In addition, the encoder module 114 may categorize the luma neighboring values and the chroma neighboring samples into the first model groups based on a distribution of the gradient neighboring values in the first model groups. The encoder module 114 may use the luma neighboring values and the chroma neighboring samples in each of the first model groups to determine a plurality of first prediction model equations.

Furthermore, in some implementations, the encoder module 114 may further calculate one or more second threshold values for each of the first model groups based on the luma neighboring values. The one or more second threshold values for each of the first model groups may be used to further separate/divide the luma neighboring values in a corresponding one of the first model groups into a plurality of second model groups. The encoder module 114 may categorize the chroma neighboring samples into the second model groups based on a plurality of region positions of the luma neighboring values in the second model groups and use the luma neighboring values and the chroma neighboring samples in each of the second model groups to determine a plurality of third prediction model equations.

The encoder module 114 and the decoder module 124 may use the same process to determine the luma neighboring values in the reference region and to divide the luma neighboring values and the chroma neighboring values into the model groups based on the one or more first threshold values and/or the one or more second threshold values.

With reference to FIGS. 1, 5, and 7, at block 550, the encoder module 114 may determine a plurality of luma reconstructed values in a luma block of the block unit and divides the plurality of luma reconstructed values into a plurality of model groups based on the one or more first threshold values. In some implementations, the encoder module 114 may apply the luma reconstructed values to the gradient filter to generate the luma gradient values. The encoder module 114 may categorize the luma gradient values into the first model groups based on the one or more first threshold values and further categorize the luma reconstructed samples or the luma down-sampled values into the first model groups based on a distribution of the luma gradient values in the first model groups. Furthermore, the encoder module 114 may further categorize the luma reconstructed values in each of the first model groups into the second model groups based on the one or more second threshold values. The encoder module 114 and the decoder module 124 may use the same process to determine the luma reconstructed values and to divide the luma reconstructed values into the model groups based on the one or more first threshold values and/or the one or more second threshold values.

With reference to FIGS. 1, 5, and 7, at block 560, the encoder module 114 may reconstruct a chroma block of the block unit by applying the plurality of model groups to a plurality of prediction model equations. The prediction model equations of the reference region may correspond to the prediction model equations of the block unit. Thus, the filter parameters of the reference region for each of the first model groups may be identical to those of the block unit for each of the first model groups. In addition, the filter parameters of the reference region for each of the second model groups may be identical to those of the block unit for each of the second model groups. The encoder module 114 may generate a chroma predicted block based on the prediction model equations of the prediction model mode for the block unit. In some implementations, the encoder module 114 may simultaneously predict the chroma block based on other chroma prediction modes to generate other predicted blocks. The encoder module 114 and the decoder module 124 may use the same process to generate the chroma predicted block based on the prediction model equations.

The encoder module 114 may traverse the chroma predicted blocks of the block unit and select one of the chroma predicted blocks based on a mode selection method, such as a cost function. The cost function may include an RDO, an SAD, an SATD, a Mean Absolute Difference (MAD), a Mean Squared Difference (MSD), and a Structural SIMilarity (SSIM). It should be noted that any cost function may be used without departing from this disclosure. When the prediction model mode having the prediction model filters is selected, the encoder module 114 may determine a plurality of residual components by comparing a plurality of color components in the block unit with the chroma predicted blocks of the block unit generated based on the prediction model filters. The encoder module 114 may further reconstruct the block unit based on the residual components and the chroma predicted blocks to generate a plurality of reference samples for a plurality of following blocks that are predicted after predicting the block unit. In addition, the residual components may be encoded into the bitstream by the encoder module 114 for providing to the decoder module 124. The method/process 500 may then end.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding video data performed by an electronic device, the method comprising:
   receiving the video data;
   determining a block unit from a current frame included in the video data;
   determining a plurality of luma reconstructed samples in a luma block of the block unit based on the video data;
   determining a prediction model filter of a prediction model mode for a chroma block of the block unit based on the video data;
   determining a plurality of luma square values and a plurality of luma gradient values based on the plurality of luma reconstructed samples; and
   reconstructing the chroma block of the block unit by applying the plurality of luma square values and the plurality of luma gradient values to the prediction model filter.

2. The method according to claim 1, wherein:
   the plurality of luma reconstructed samples is applied to a down-sampling filter to generate a plurality of luma down-sampled values,
   each of the plurality of luma down-sampled values is applied to a gradient filter to generate the plurality of luma gradient values, and
   each of the plurality of luma down-sampled values is squared to generate the plurality of luma square values.

3. The method according to claim 2, wherein the gradient filter comprises one of a vertical gradient filter and a horizontal gradient filter.

4. The method according to claim 1, further comprising:
   determining a reference region neighboring the block unit;
   determining a plurality of luma neighboring samples and a plurality of chroma neighboring samples of the reference region;
   determining a first filter parameter and a second filter parameter of the prediction model filter based on the plurality of luma neighboring samples and the plurality of chroma neighboring samples; and
   applying the plurality of luma square values and the plurality of luma gradient values to the prediction model filter by multiplying the plurality of luma square values by the first filter parameter and multiplying the plurality of luma gradient values by the second filter parameter.

5. The method according to claim 1, wherein:
   the prediction model mode comprises a plurality of non-linear model filters,
   the prediction model filter comprises one of the plurality of non-linear model filters, and
   each of the plurality of non-linear model filters comprises a first filter parameter and a second filter parameter.

6. The method according to claim 5, further comprising:
   determining a reference region neighboring the block unit;
   determining a plurality of luma neighboring samples and a plurality of chroma neighboring samples of the reference region;
   determining a plurality of neighboring down-sampled values based on the plurality of luma neighboring samples;
   categorizing the plurality of neighboring down-sampled values into a plurality of model groups based on one or more luma threshold values;
   categorizing the plurality of chroma neighboring samples into the plurality of model groups based on a distribution of the plurality of neighboring down-sampled values in the plurality of model groups; and
   determining the first filter parameter and the second filter parameter for each of the plurality of non-linear model filters based on the plurality of neighboring down-sampled values and the plurality of chroma neighboring samples in a corresponding one of the plurality of model groups.

7. The method according to claim 6, wherein:
a number of the plurality of model groups is equal to a number of the plurality of non-linear model filters, and
a number of the one or more threshold values is equal to a value generated by subtracting one from the number of the plurality of model groups.

8. The method according to claim 6, wherein:
the one or more luma threshold values are one of a first average of the plurality of neighboring down-sampled values and a second average of a plurality of gradient neighboring values when the number of the plurality of model groups is equal to two, and
each of the plurality of neighboring down-sampled values is applied to a gradient filter to generate the plurality of gradient neighboring values.

9. The method according to claim 6, further comprising:
determining a plurality of luma down-sampled values by applying the plurality of luma reconstructed samples to a down-sampling filter;
comparing a specific one of the luma down-sampled values with the one or more threshold values to determine whether a sample value of the specific one of the luma down-sampled values is included in a specific one of the plurality of model groups;
determining a specific one of the plurality of luma square values and a specific one of the plurality of luma gradient values based on the specific one of the luma down-sampled values; and
applying the specific one of the plurality of luma square values and the specific one of the plurality of luma gradient values to a specific one of the plurality of non-linear model filters corresponding to the specific one of the plurality of model groups.

10. An electronic device for decoding video data, the electronic device comprising:
one or more processors; and
one or more non-transitory computer-readable media coupled to the one or more processors and storing one or more computer-executable instructions that, when executed by at least one of the one or more processors, cause the electronic device to:
receive the video data;
determine a block unit from a current frame included in the video data;
determine a plurality of luma reconstructed samples in a luma block of the block unit based on the video data;
determine a prediction model filter of a prediction model mode for a chroma block of the block unit based on the video data;
determine a plurality of luma square values and a plurality of luma gradient values based on the plurality of luma reconstructed samples; and
reconstruct the chroma block of the block unit by applying the plurality of luma square values and the plurality of luma gradient values to the prediction model filter.

11. The electronic device according to claim 10, wherein:
the plurality of luma reconstructed samples is applied to a down-sampling filter to generate a plurality of luma down-sampled values;
each of the plurality of luma down-sampled values is applied to a gradient filter to generate the plurality of luma gradient values, and
each of the plurality of luma down-sampled values is squared to generate the plurality of luma square values.

12. The electronic device according to claim 10, wherein the one or more computer-executable instructions, when executed by the at least one of the one or more processors, further cause the electronic device to:
determine a reference region neighboring the block unit;
determine a plurality of luma neighboring samples and a plurality of chroma neighboring samples of the reference region;
determine a first filter parameter and a second filter parameter of the prediction model filter based on the plurality of luma neighboring samples and the plurality of chroma neighboring samples; and
apply the plurality of luma square values and the plurality of luma gradient values to the prediction model filter by multiplying the plurality of luma square values by the first filter parameter and multiplying the plurality of luma gradient values by the second filter parameter.

13. The method according to claim 10, wherein:
the prediction model mode comprises a plurality of non-linear model filters,
the prediction model filter comprises one of the plurality of non-linear model filters, and
each of the plurality of non-linear model filters comprises a first filter parameter and a second filter parameter.

14. A method of decoding video data performed by an electronic device, the method comprising:
receiving the video data;
determining a block unit from a current frame included in the video data;
determining a plurality of luma reconstructed values in a luma block of the block unit based on the video data;
determining a prediction model filter of a prediction model mode for a chroma block of the block unit based on the video data;
determining a first value set including a plurality of first luma values and a second value set including a plurality of second luma values based on the plurality of luma reconstructed values, wherein:
at least one of the first value set and the second value set is generated by applying the plurality of luma reconstructed values to a corresponding one of a plurality of gradient filters, and
at least one of the first value set and the second value set is generated by squaring the plurality of luma reconstructed values or a plurality of luma intermediate values generated from the plurality of luma reconstructed values; and
reconstructing the chroma block of the block unit by applying the plurality of first luma values and the plurality of second luma values to the prediction model filter.

15. The method according to claim 14, wherein:
the plurality of first luma values comprises a plurality of luma squared gradient values generated by applying the plurality of luma reconstructed values to the one of the plurality of gradient filters to generate the plurality of luma intermediate values and further squaring the plurality of luma intermediate values, and
the plurality of second luma values is equal to the plurality of luma reconstructed values.

16. The method according to claim 14, wherein:
the plurality of first luma values is a plurality of luma squared gradient values generated by applying the plurality of luma reconstructed values to the one of the plurality of gradient filters to generate the plurality of luma intermediate values and further squaring the plurality of luma intermediate values, and the plurality of second luma values is equal to the plurality of luma intermediate values.

17. The method according to claim 14, wherein:
the plurality of first luma values comprises a plurality of luma squared values generated by squaring the plurality of luma reconstructed values, and
the plurality of second luma values comprises a plurality of luma gradient values generated by applying the plurality of luma reconstructed values to the one of the plurality of gradient filters.

18. The method according to claim 14, further comprising:
   determining a reference region neighboring the block unit;
   determining a plurality of luma neighboring samples and a plurality of chroma neighboring samples of the reference region;
   determining a first filter parameter and a second filter parameter of the prediction model filter based on the plurality of luma neighboring samples and the plurality of chroma neighboring samples; and
   applying the plurality of first luma values and the plurality of second luma values to the prediction model filter by multiplying the plurality of first luma values by the first filter parameter and multiplying the plurality of second luma values by the second filter parameter.

19. The method according to claim 14, wherein:
the prediction model mode comprises a plurality of non-linear model filters,
the prediction model filter comprises one of the plurality of non-linear model filters, and
each of the plurality of non-linear model filters comprises a first filter parameter and a second filter parameter.

20. The method according to claim 19, further comprising:
   determining a reference region neighboring the block unit;
   determining a plurality of luma neighboring samples and a plurality of chroma neighboring samples of the reference region;
   determining a plurality of neighboring down-sampled values based on the luma neighboring samples;
   categorizing the plurality of neighboring down-sampled values into a plurality of model groups based on one or more luma threshold values;
   categorizing the plurality of chroma neighboring samples into the plurality of model groups based on a distribution of the plurality of neighboring down-sampled values in the plurality of model groups; and
   determining the first filter parameter and the second filter parameter for each of the plurality of non-linear model filters based on the plurality of neighboring down-sampled values and the plurality of chroma neighboring samples in a corresponding one of the plurality of model groups.

* * * * *